(12) United States Patent
Mai

(10) Patent No.: US 11,505,371 B2
(45) Date of Patent: Nov. 22, 2022

(54) CONTAINERS AND CLOSURES

(71) Applicant: HUSKY INJECTION MOLDING SYSTEMS LTD., Bolton (CA)

(72) Inventor: Arnold Heinz Mai, Irrel (DE)

(73) Assignee: Husky Injection Molding Systems Ltd., Bolton (CA)

( * ) Notice: Subject to any disclaimer, the term of this patent is extended or adjusted under 35 U.S.C. 154(b) by 256 days.

(21) Appl. No.: 15/767,173

(22) PCT Filed: Sep. 23, 2016

(86) PCT No.: PCT/CA2016/051120
§ 371 (c)(1),
(2) Date: Apr. 10, 2018

(87) PCT Pub. No.: WO2017/066868
PCT Pub. Date: Apr. 27, 2017

(65) Prior Publication Data
US 2018/0297752 A1    Oct. 18, 2018

Related U.S. Application Data

(60) Provisional application No. 62/245,458, filed on Oct. 23, 2015.

(51) Int. Cl.
*B65D 41/32* (2006.01)
*B65D 39/00* (2006.01)
(Continued)

(52) U.S. Cl.
CPC ....... *B65D 41/325* (2013.01); *B65D 39/0023* (2013.01); *B65D 41/0421* (2013.01);
(Continued)

(58) Field of Classification Search
CPC .............. B65D 41/325; B65D 41/3447; B65D 41/0421; B65D 41/3428; B65D 51/1688;
(Continued)

(56) References Cited

U.S. PATENT DOCUMENTS 3,072,277 A * 1/1963 Hoffmann .............. B65D 41/58
215/253
3,074,579 A    1/1963 Miller
(Continued)

FOREIGN PATENT DOCUMENTS

CN    1113202 A    12/1995
CN    2668541 Y    1/2005
(Continued)

OTHER PUBLICATIONS

European Search Report, Fournier, Jacques, dated Jul. 3, 2019, 7 pages.
(Continued)

*Primary Examiner* — Ernesto A Grano

(57) ABSTRACT

A closure may have a top wall and a side wall depending from the top wall. A plug seal device may depend from said top wall within the side wall. The plug seal device may have an upper section, a lower section, and a sealing section proximate the boundary between the upper section and the lower section. The sealing section is operable such that when the plug seal device is inserted in an opening to an inner cavity in a container, the sealing section engages with an inner container surface to provide a seal between an inner cavity of the container and the external environment.

31 Claims, 23 Drawing Sheets

(51) Int. Cl.
  B65D 51/16 (2006.01)
  B65D 41/58 (2006.01)
  B65D 41/34 (2006.01)
  B65D 41/04 (2006.01)
  *B29C 45/00* (2006.01)
  *B29K 23/00* (2006.01)
  *B29L 31/56* (2006.01)

(52) U.S. Cl.
  CPC ..... B65D 41/3428 (2013.01); B65D 41/3447 (2013.01); B65D 41/58 (2013.01); B65D 51/1622 (2013.01); B65D 51/1688 (2013.01); *B29C 45/0081* (2013.01); *B29K 2023/065* (2013.01); *B29L 2031/565* (2013.01); *B65D 2251/0015* (2013.01); *B65D 2251/0075* (2013.01)

(58) Field of Classification Search
  CPC . B65D 41/58; B65D 39/0023; B65D 51/1622
  USPC .......................................................... 215/252
  See application file for complete search history.

(56) References Cited

U.S. PATENT DOCUMENTS

| | | | |
|---|---|---|---|
| 3,186,573 A * | 6/1965 | Salminen | B65D 41/185 |
| | | | 215/270 |
| 3,223,269 A * | 12/1965 | Williams | B65D 41/0471 |
| | | | 215/318 |
| 3,441,161 A * | 4/1969 | Van Baarn | B65D 41/3447 |
| | | | 215/235 |
| 3,473,685 A * | 10/1969 | Karlan | B65D 41/525 |
| | | | 215/253 |
| 3,677,430 A | 7/1972 | Yates, Jr. | |
| 3,815,770 A * | 6/1974 | Guala | B65D 41/485 |
| | | | 215/253 |
| 3,877,598 A * | 4/1975 | Hazard | B65D 47/148 |
| | | | 215/224 |
| 3,944,104 A * | 3/1976 | Watson | B65D 41/0421 |
| | | | 215/307 |
| 4,253,581 A | 3/1981 | Aichinger et al. | |
| 4,342,400 A * | 8/1982 | Llera | B65D 39/00 |
| | | | 215/256 |
| 4,380,304 A * | 4/1983 | Anderson | B65D 43/0229 |
| | | | 220/782 |
| 4,856,668 A | 8/1989 | Pfefferkorn et al. | |
| 4,872,304 A * | 10/1989 | Thompson | B29C 55/00 |
| | | | 53/487 |
| 4,915,244 A * | 4/1990 | Celaschi | B65D 41/3409 |
| | | | 215/252 |
| 5,275,287 A | 1/1994 | Thompson | |
| 5,630,522 A | 5/1997 | Montgomery | |
| 5,662,233 A * | 9/1997 | Reid | B65D 41/58 |
| | | | 215/273 |
| 5,954,215 A * | 9/1999 | Alter | B65D 41/185 |
| | | | 215/318 |
| 6,126,027 A | 10/2000 | Thompson | |
| 6,338,414 B1 * | 1/2002 | Schellenbach | B65D 41/0421 |
| | | | 215/252 |
| 6,821,463 B2 * | 11/2004 | Di Dio | B29C 45/68 |
| | | | 264/328.1 |
| 6,851,586 B2 * | 2/2005 | Odet | B65D 47/148 |
| | | | 215/235 |
| 7,021,477 B2 | 4/2006 | Wolfe | |
| 7,743,952 B2 * | 6/2010 | Auer | B65D 41/185 |
| | | | 215/237 |
| 7,891,512 B2 | 2/2011 | Brosius | |
| 9,884,705 B2 * | 2/2018 | Wood | B65D 41/0421 |
| 2009/0120899 A1 | 5/2009 | Stull, Sr. et al. | |
| 2011/0139746 A1 * | 6/2011 | Schellenbach | B65D 41/0421 |
| | | | 215/329 |
| 2014/0021157 A1 * | 1/2014 | Gren | B65D 41/0421 |
| | | | 215/252 |
| 2014/0158660 A1 * | 6/2014 | Wood | B65D 41/3428 |
| | | | 215/252 |
| 2014/0190925 A1 * | 7/2014 | Ropele | B29C 45/0003 |
| | | | 215/44 |
| 2014/0319144 A1 * | 10/2014 | Tsuzuki | B65D 41/0428 |
| | | | 220/304 |
| 2015/0045485 A1 * | 2/2015 | Tsutimoto | C08K 5/34 |
| | | | 524/151 |
| 2018/0009142 A1 * | 1/2018 | Benoit-Gonin | B29C 45/1676 |
| 2019/0135507 A1 * | 5/2019 | Schlusemann | B65D 41/0421 |
| 2019/0367247 A1 * | 12/2019 | Romeo | B65D 41/3447 |
| 2019/0375555 A1 * | 12/2019 | Edie | B65D 81/267 |

FOREIGN PATENT DOCUMENTS

| | | |
|---|---|---|
| CN | 203780992 | 8/2014 |
| CN | 104015992 A | 9/2014 |
| EP | 0119055 A2 | 9/1984 |
| EP | 2468654 A1 | 6/2012 |
| EP | 2784001 A1 | 10/2014 |
| EP | 3275801 A1 | 1/2018 |
| FR | 2236747 A1 | 2/1975 |
| GB | 2311285 A | 9/1997 |
| JP | 2001080658 A | 3/2001 |
| WO | 2008019443 A1 | 2/2008 |

OTHER PUBLICATIONS

PCT International Search Report; Hanham, Tanya; dated Dec. 6, 2016; 3 pages.

* cited by examiner

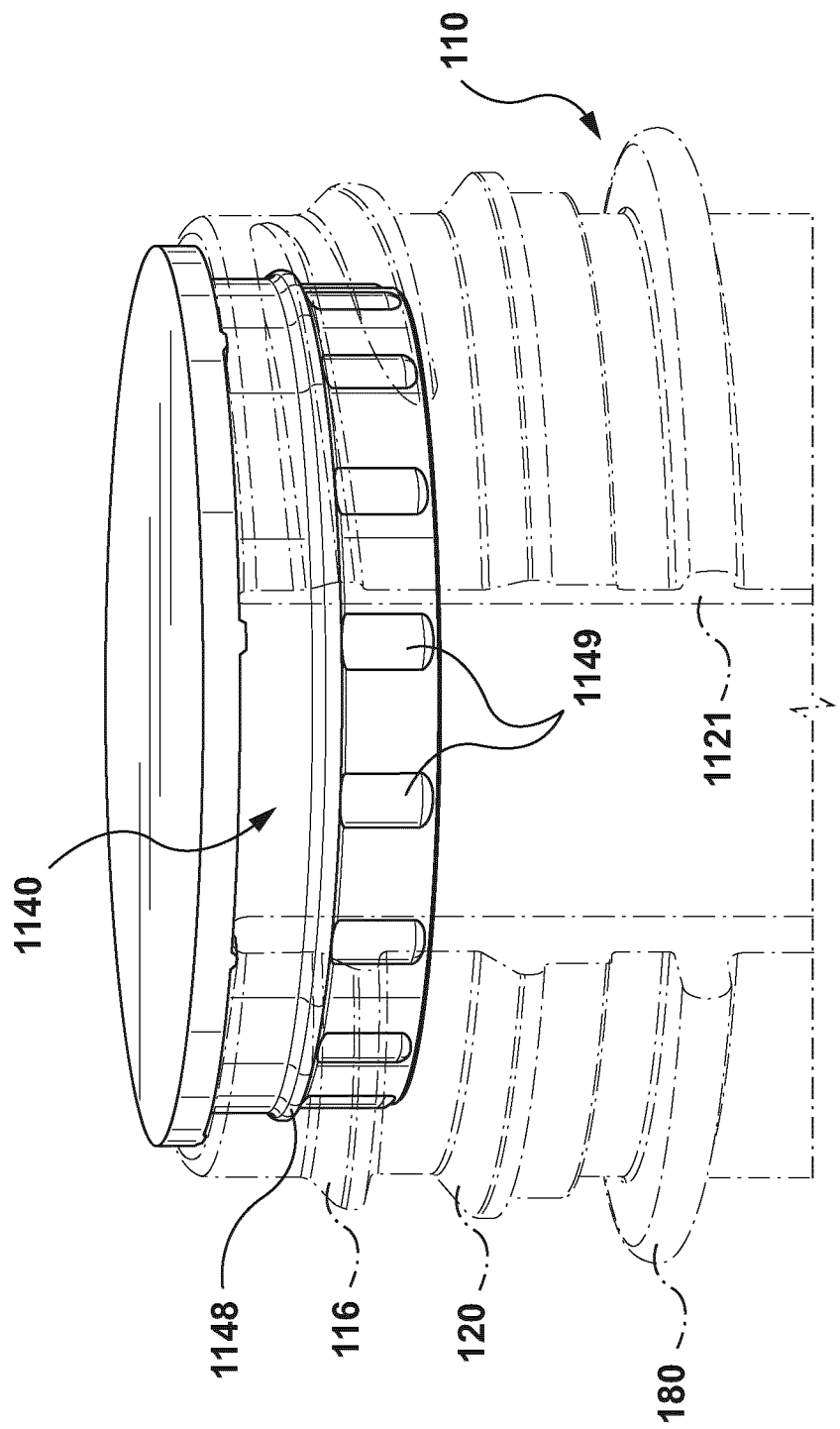

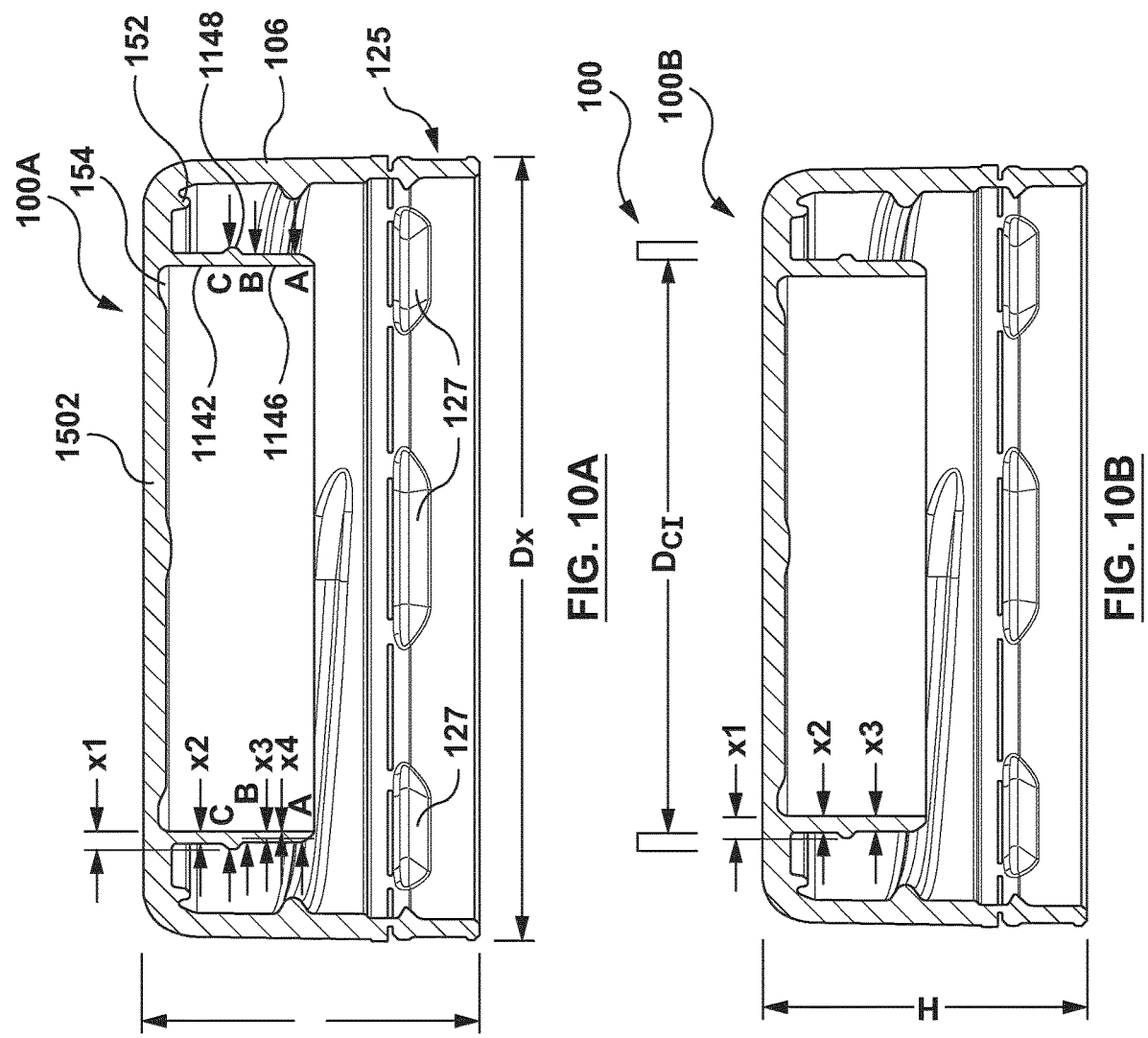

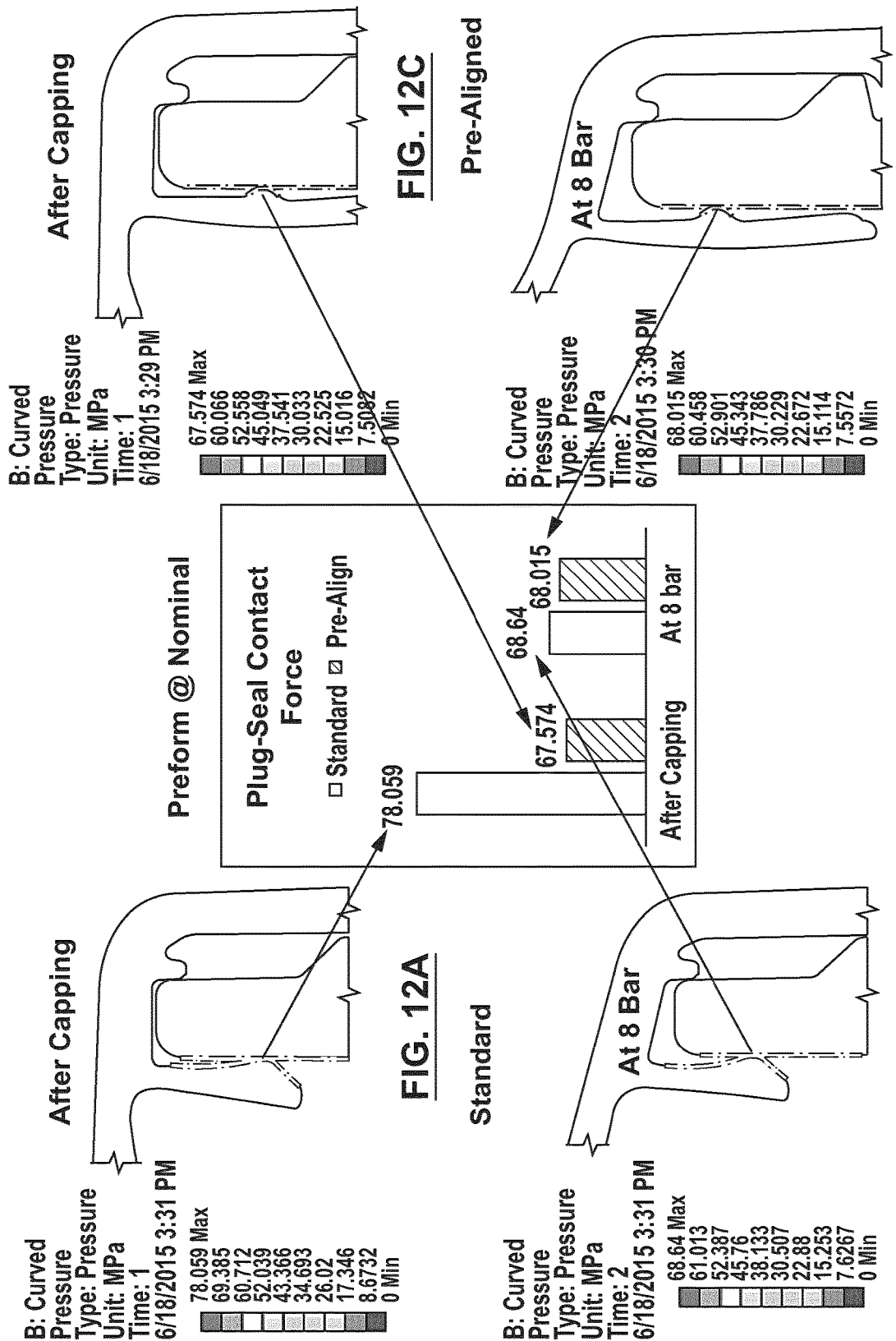

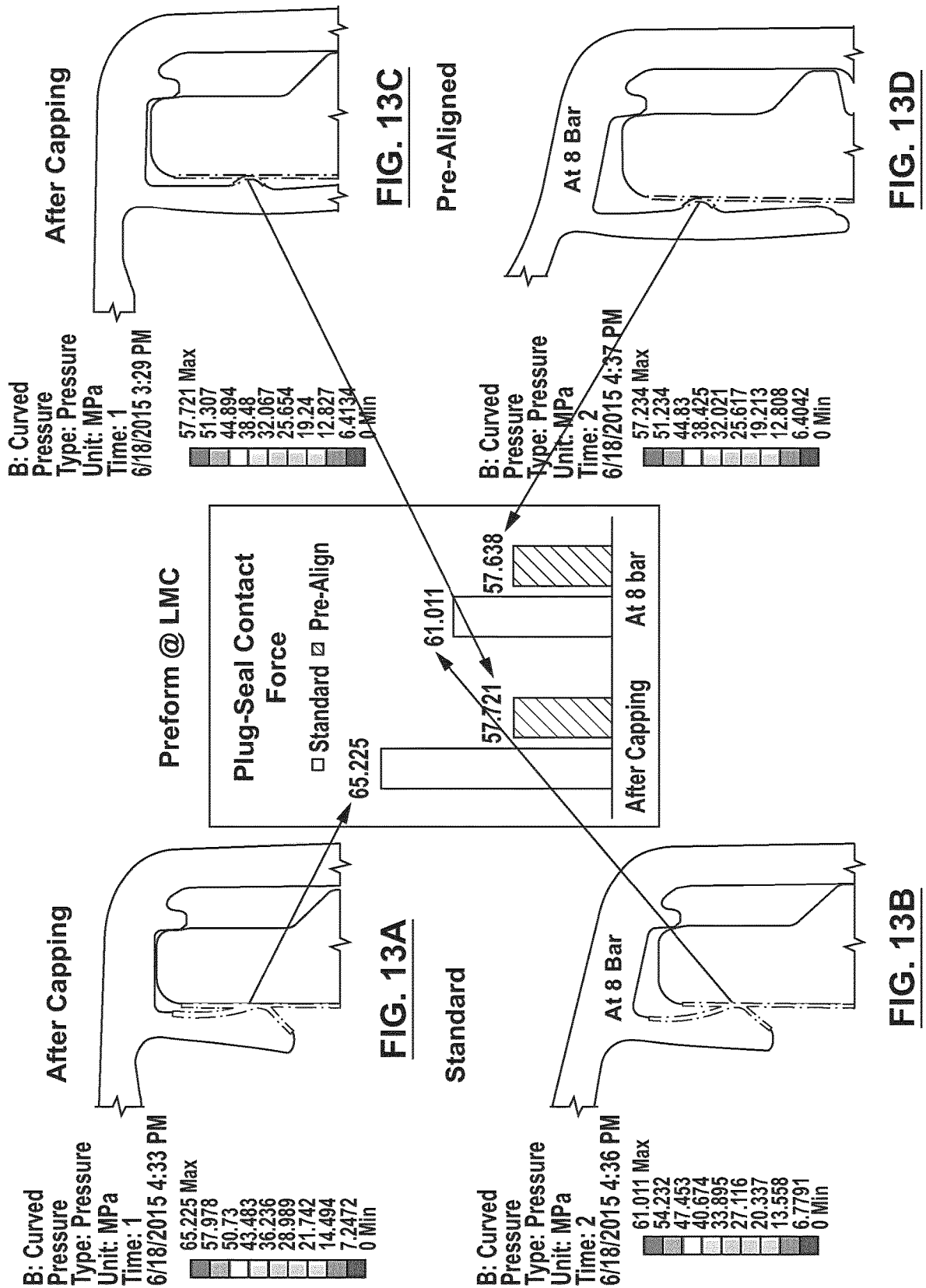

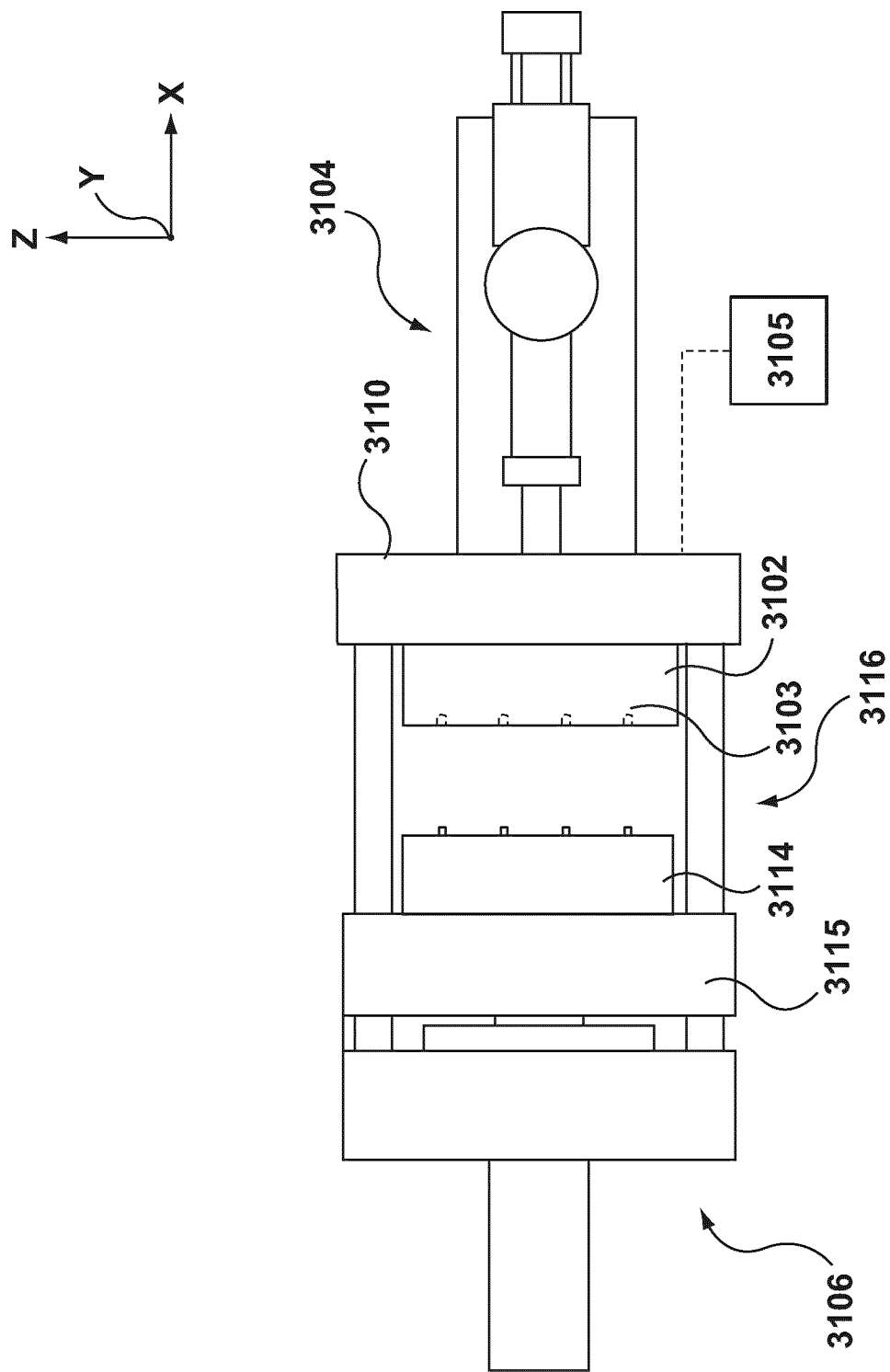

CONTAINERS AND CLOSURES

TECHNICAL FIELD

This relates to closures for containers and combinations of closures and containers.

BACKGROUND

Containers of various types are known for liquids, gases and/or solids. Also, various types of closures for containers are known.

Containers, including containers blown from preforms, may be made from a variety of materials including glass, metals and polymers/plastics. Many containers are configured in the form of a bottle and many are made from a wide variety of materials including polymers/plastics such as for example polyethylene terephthalate ("PET"). Similarly closures for such containers may also be made from a wide variety of materials including polypropylene and polyethylene.

It is often important that the container and its contents are properly sealed within the inner cavity of the container by a closure. To provide for a suitable seal between the closure and the inner cavity of the container, in addition to having mating threads on the outside of the neck portion and the inside sidewall surface of the closure, a closure may also be provided with a plug seal device which may be received into the opening in the container wall, such as for example an opening formed in a neck region of a container.

In at least some situations, the insertion of the plug seal device into the open cavity of the neck region can result in one or more problems. One such problem that may arise relates to the radial reaction forces resulting when the plug seal device is inserted into the neck region cavity, which may create radial compression forces that may tend to try to reorient the plug seal device and at least part of the rest of the closure interconnected thereto, to a parallel orientation relative to the vertical inner surface wall of the neck region. The result of this tendency may be misalignment of the threads on the inside sidewall surface of the closure with the threads on the outer surface of the neck region which may lead to a condition known as a "cocked cap" in which the top panel of the closure may be distorted in shape from a generally planar orientation.

Some closures are known as "multi-start caps" as these have more than one location where thread starts are located or commence. If there is a mis-alignment of the closure with container, these types of closures are particularly vulnerable to coming into interference and/or improper engagement with the corresponding multiple thread starts of the container. If there is interference between the thread start of the closure and the thread start of the container, in some circumstances one or more thread starts of the closure may move onto the wrong side of the thread starts of the container during the relative rotation of the closure and the container. This can enhance the risk of a cocked cap condition developing or other improper engagement of the closure with the container.

Also, closures and/or their containers may be not formed to precise structural or dimensional tolerances. This can also result in improper axial alignment of the closure and its threads relative to the container and its threads.

An improved closure with plug seal device is therefore desirable.

SUMMARY

According to one aspect, there is provided a closure comprising: a top wall and a side wall depending from the top wall, and a plug seal device depending from the top wall within the side wall. The plug seal device has an upper section, a lower section, and a sealing section proximate the boundary between the upper section and the lower section. The sealing section is operable such that when the plug seal device is inserted in an opening to an inner cavity in a container, the sealing section engages with an inner container surface to provide a seal between an inner cavity of the container and the external environment.

According to another aspect, there is provided a closure comprising a top wall and a tubular side wall extending from the top wall. A tubular plug seal device extends from the top wall within and spaced from the side wall. The plug seal device has a sealing section, an upper section extending from the sealing section upwards to the top wall, and a lower section extending downwards from the sealing section. The sealing section is operable such that when the plug seal device is inserted in an opening to an inner cavity in a container, the sealing section engages with an inner container surface to provide a seal between an inner cavity of the container and the external environment.

According to another aspect there is provided a combination of a closure as recited above, and a container. The container comprises a container wall enclosing an inner cavity, the container wall having an opening into the inner cavity, the container wall having an inner container surface proximate the opening. The sealing section of the plug seal device is configured and operable when the plug seal device is inserted in the opening, to engage with the container surface to provide an initial seal between the inner cavity of the container and the external environment.

A according to another aspect there is provided a system for making a closure as recited above. The system comprises a first mold half and a second mold half. The first and second mold halves are configured and operable to be movable relative to each other between (i) a first position which creates a mold cavity wherein the first and second mold halves are in a closed relationship to each other wherein a molded closures may be formed in the mold cavity, and (ii) a second position wherein the first and second mold halves are in a separated relationship wherein a molded closure molded in the mold cavity can be removed from the mold cavity.

Other features will become apparent from the drawings in conjunction with the following description.

DESCRIPTION OF THE DRAWINGS

In the figures which illustrate example embodiments,

FIG. 9 is an upper perspective view of the plug seal and container of FIG. 6 with the closure and container in a final engagement position relative to each other;

FIGS. 10A, 10B, and 10C are vertical elevation medial cross sectional views through example closures;

FIGS. 12A and 12B are charts depicting the results of a Design of Experiments (DOE) using a simplified 2 dimensional Finite Element Analysis with a linear-elastic material-models, for a known closure of nominal dimensions;

FIGS. 12C and 12D are charts depicting the results of a Design of Experiments (DOE) using a simplified 2 dimensional Finite Element Analysis with a linear-elastic material-models, for an embodiment of a closure of nominal dimensions;

FIGS. 13A and 13B are charts depicting the results of a Design of Experiments (DOE) using a simplified 2 dimensional Finite Element Analysis with a linear-elastic material-models, for a known closure of least material condition (LMC);

FIGS. 13C and 13D are charts depicting the results of a Design of Experiments (DOE) using a simplified 2 dimensional Finite Element Analysis with a linear-elastic material-models, for an embodiment of a closure of least material condition (LMC);

FIG. 15 is a schematic view of an injection molding system that may be employed to form any of the closures depicted in FIGS. 1 to 8A, and FIGS. 10A-C and 10E.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Figure 1:
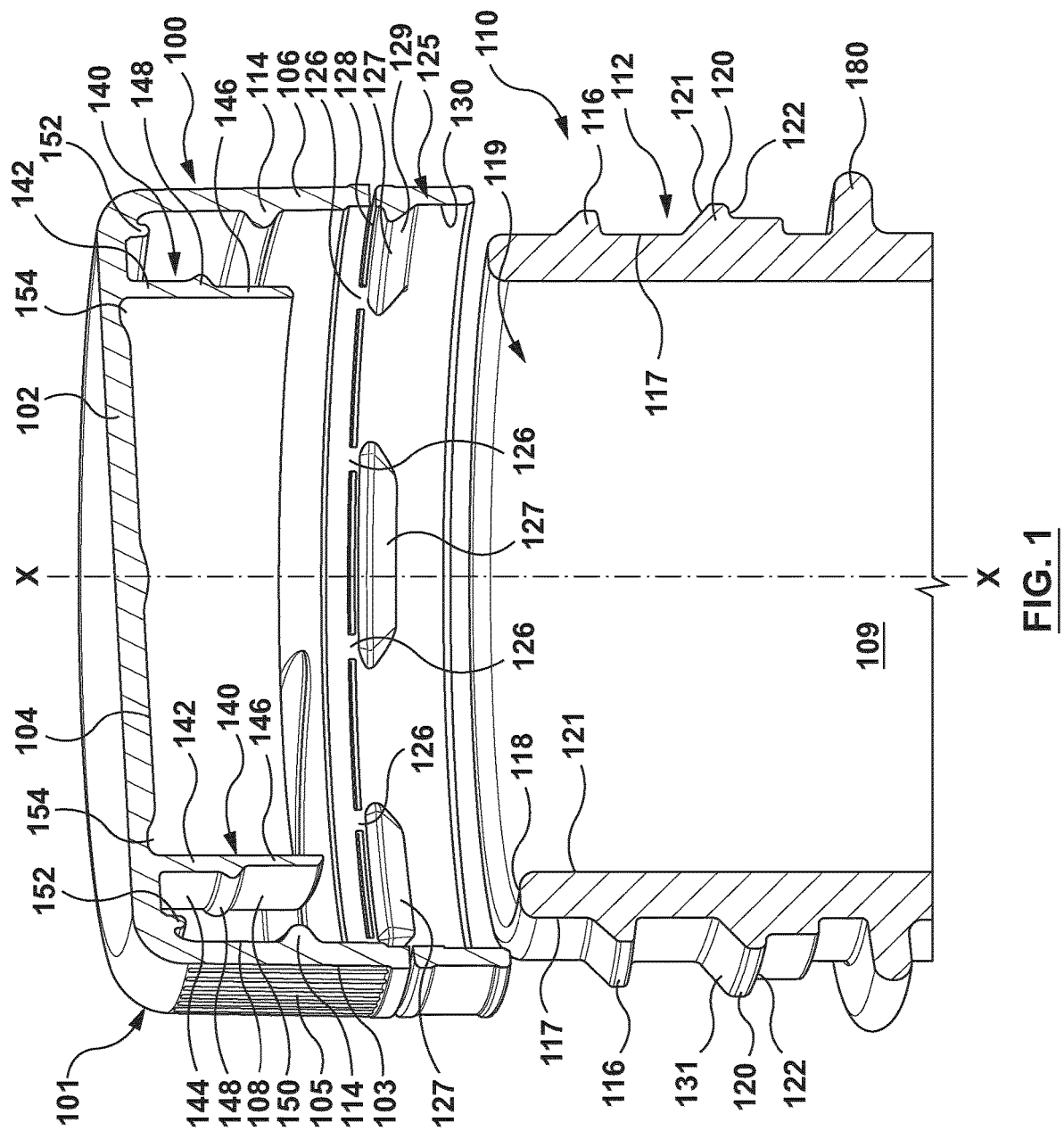
FIG. 1 is a broken away, elevation section view of part of a closure and part of a container in a disengaged position relative to each other.

With reference initially only to FIG. 1, an example closure 100 is shown. Closure 100 may be made from any suitable material(s) such as a relatively hard, resilient plastic/polymer, such as by way of example only, resilient polypropylene or polyethylene. Also shown is an example neck region 112 defining part of an inner cavity 109 of an example container 110. Container 110 may also be made entirely from any suitable material(s) such as by way of example only polyethylene terephthalate (PET) or polypropylene (PP) or polyethylene. Container 110 may be a container blown from a preform. Both container 110 and closure 100 may be formed, at least in part, using adapted molding equipment, such as for example injection molding equipment, of the type generally known to persons skilled in the art in the industry.

The features of closure 100 as hereinafter described may be formed as a unitary piece of material. Closure 100 may be configured in a generally right circular cylindrical tubular shaped shell 101 that is closed at a top end with a circular disc shaped top wall 102 with a downward facing, generally flat, surface 104. Shell 101 also has a generally right circular cylindrical tubular shaped side wall 106 having an outward facing generally right circular cylindrical surface 103 and inwardly facing, generally right circular cylindrical surface 108. Outward facing surface 103 may be provided with a plurality of spaced vertically oriented ribs 105 (i.e. knurls) that may assist in application and removal of closure 100 to a container by a capping machine and/or an individual.

Inward facing surface 108 of closure 100 may be provided with one or more angled, spiral spaced threads or bayonets 114. Threads 114 formed on the inward facing surface 108 of closure 100 may complement and be configured to engage with corresponding one or more angled, spiral spaced threads 116 formed on an exterior generally cylindrical surface 117 of neck region 112 of container 110, proximate an upwardly oriented opening 119 into the inner cavity of container 110. By providing more than one set of complementary spaced threads 114 and 116, it may be possible to have more than one thread start engagement position.

Closure 100 can be secured to container 110 to close opening 119 by engaging threads 114 of closure 100 with threads 116 of container 110 and rotating threads 114 relative to threads 116. To effect such an engagement, respective threads 114, 116 should be initially positioned in a suitable thread start engagement position of closure 100 relative to container 110 initially by suitable angular positioning about axis X-X of threads 114 relative to threads 116 and with vertical/axial positioning of closure 100 relative to container 110, which may be achieved or example by moving closure 100 relative to container 110 through the positions shown in FIGS. 14(*a*) to 14(*c*). A suitable thread start engagement position of closure 100 relative to container 110 provides that the central axial axes of the container 110 and the closure 100 are aligned about common vertical/longitudinal axis X-X and includes both a suitable thread start angular orientation about axis X-X (FIG. 1) and a suitable thread start axial (eg. vertical/longitudinal) position of closure 100 relative to container 110 such as shown in FIG. 14(*c*). When closure 100 and container 110 are positioned relative to each other at both a suitable thread start angular orientation and a suitable thread start axial/vertical position, the rotation of closure 100 in one rotational direction relative to container 110 will cause threads 114 to engage with threads 116. In such a thread start engagement position threads 114 of closure 100 are axially aligned, and are also angularly and axially positioned, with respect to threads 116 of container 110 so that threads 114 of closure 100 are capable of properly engaging with threads 116 of the container 110 when closure 100 is thereafter rotated relative to container 110 from the position shown in FIG. 14(*c*) about common vertical/longitudinal axis X-X as shown in FIG. 1, through the positions shown in FIG. 14(*d*) and then FIG. 14(*e*) to reach the fully engaged thread position shown in FIG. 14(*f*).

The exterior surface 117 of neck region 112 of container 110 may also be provided with a pilfer band 120 in the form of a circumferential, generally toroidal shaped shoulder which has an upper, angled shoulder surface 131 and a generally horizontally oriented (ie. generally perpendicular to the orientation of the exterior surface 117) lower, shoulder surface 122. Neck region 112 may also have a support ledge 180 positioned beneath the pilfer band 120 in the form of a lower extended annular shoulder which may be used during blow molding, capping and handling of the container.

A generally right circular cylindrical tubular tamper evident band generally designated 125 may be located vertically/axially below side wall 103 of closure 100. Tamper evident band 125 may be connected by frangible connector portions 126 to generally right circular cylindrical tubular side wall 103. Tamper evident band 125 may also include a plurality of circumferentially extending, spaced cams 127 in the form of shoulder members formed on inner generally cylindrical surface 130 of tamper evident band 125. Cams 127 may be provided with a generally horizontally oriented upper shoulder surface 128 and a lower, angled shoulder surface 129. During application of closure 100 to container 110, by rotation about axis X-X in one rotational direction, tamper evident band 125 will elastically deform such that the angled surface 129 of tamper evident band 125 will slide over angled surface 131 of pilfer band 120 will engage with and such that lower generally horizontal surface 122 of pilfer band 120 will be in face to face relation with the upper surfaces 128 of tamper evident band cams 127. When closure 100 is to be removed from neck region 112 of container 110, the resistance force created by the interface between lower generally horizontal surface 122 of pilfer band 120 that comes into engagement with the generally horizontally oriented upper surfaces 128 of tamper evident band cams 127 will be greater than the breaking force of frangible connector portions 126, and thus continued opposite direction rotation of closure 100 relative to container 110 about axis X-X will cause the frangible connector portions 126 to break. Thus, closure 100 can be removed from engagement with container 110, but tamper evident band 125 will remain in position on container 110.

Closure 100 also has a plug seal device 140 having sealing features which, when closure 100 is applied to container 110, create a solid, fluid and/or gas seal between: (i) the interior cavity 109 of the container 110 and the contents that may be contained therein; and (ii) the external environment. Plug seal device 140 also includes a pre-alignment feature as described hereinafter in detail, which helps facilitate the vertical/longitudinal axial movement and positioning of closure 100 relative to container 110 as it moves from the position shown in FIG. 14(*a*) through the start of a seal engagement position, to the thread start engagement position shown in FIG. 14(*c*) and through to the final thread engagement position shown in FIG. 14(*f*).

Returning to FIG. 1, a plug seal device such as plug seal device 140 may be integrally connected and formed with top wall 102 of closure 100 and may depend substantially vertically/axially downward therefrom. Plug seal device 140 can be spaced radially apart from inward facing surface 108 of side wall 106 of shell 101 to allow the upper portion 118 of neck region 112 of container 110 to be received there between.

Plug seal device 140 may have a generally right circular cylindrical tubular upper wall section 142 and a generally right circular cylindrical tubular lower wall section 146. Upper wall section 142 and lower wall section 146 may be inter-connected and divided vertically/longitudinally from each other by a sealing section 148 located proximate the boundary of the upper and lower wall sections. Sealing section 148 may be integrally formed as part of plug seal device 140 and may be formed in a generally semi-circular toroidal shape, lobe shape, a generally annular ring shape or any other suitable shape that protrudes radially outward beyond both the radially outward facing cylindrical surface 144 of upper wall section 142 and radially outward beyond the radially outward facing cylindrical surface 150 of lower wall section 146. Sealing section 148 may have a generally arcuate outer sealing surface area.

Sealing section 148 is configured and operable such that when it engages with inner surface 121 of the neck region 112 it provides a complete circumferential seal between plug seal device 140 and the inner surface 121 of neck region 112 of container 110, when the sealing section is received through opening 119 of neck region 112 and the sealing section is engaged with the inner surface 121. In operation of some embodiments, when being received into opening 119 of neck region 112, sealing section 148 of plug seal device 140 may provide the first/initial seal between the inner cavity 109 of container 110 and the external environment. In some embodiments, a secondary seal may also be provided between the inner cavity 109 and the external environment, such as a seal between the plug seal device 140 and an external surface of the neck region 112.

Figure 3:
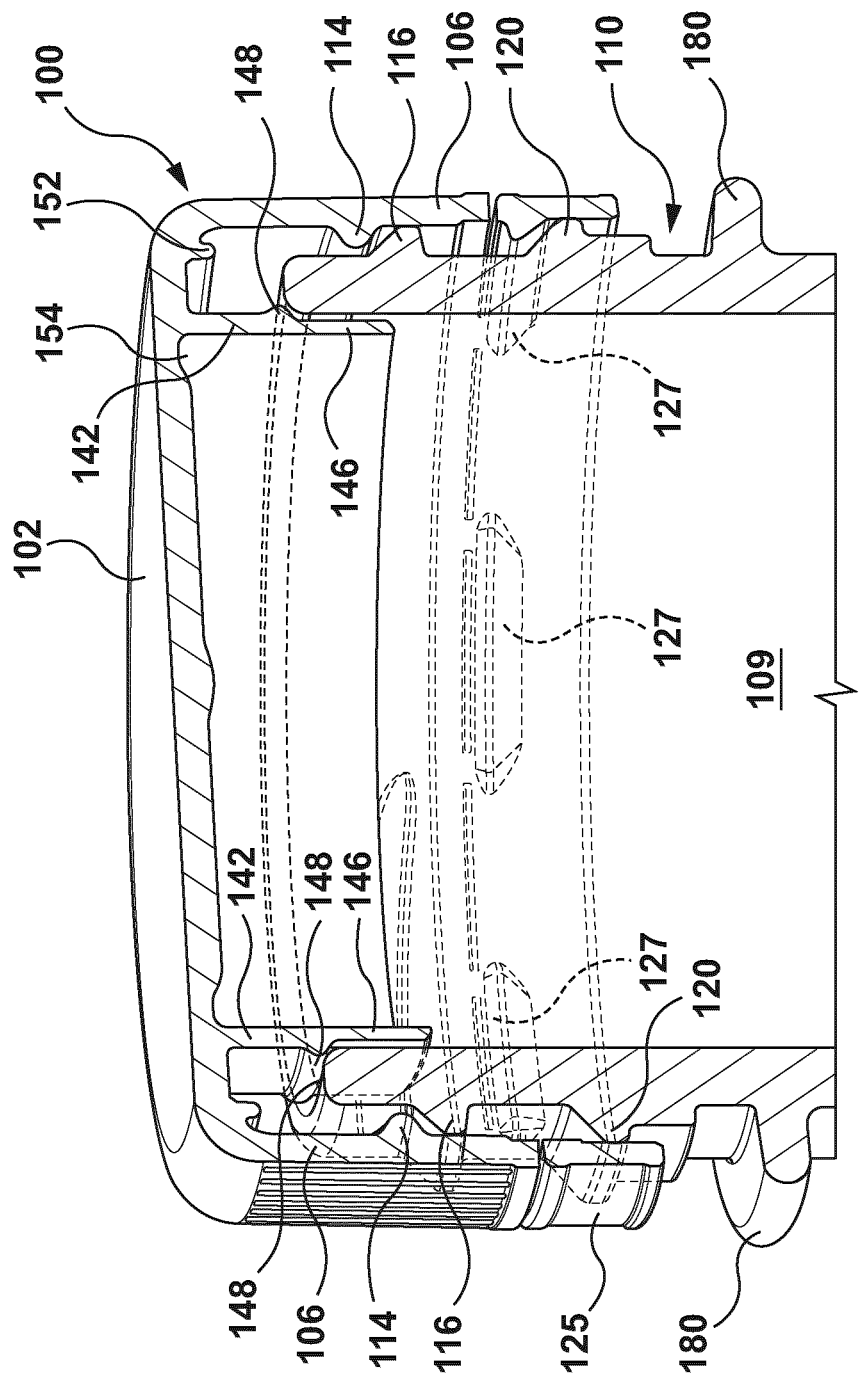
FIG. 3 is a broken away elevation section view of the closure and container of FIG. 1 with the closure and container in a commencement of seal engagement position relative to each other.
Figure 4:
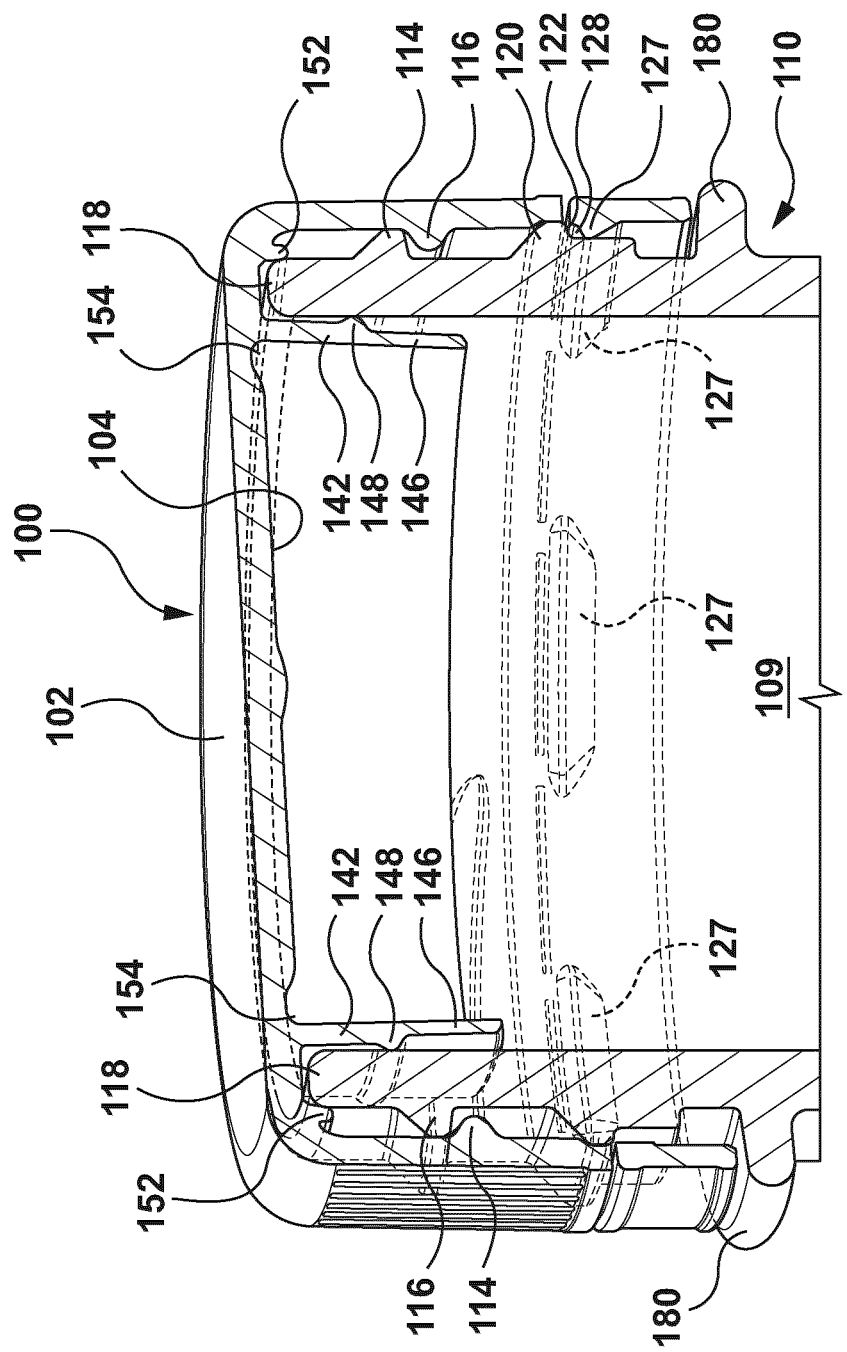
FIG. 4 is a broken away elevation section view of the closure and container of FIG. 1 with the closure and container in a final fully engaged position relative to each other.

Lower wall section 146 may provide an alignment function to axially/longitudinally and horizontally/transversely align, plug seal device 140 and thus closure 100 relative to container 110, as plug seal 140 is inserted into the opening 119 of neck region 112. This helps ensure that the central longitudinal axis of the closure 100 remains substantially coincident and aligned with the central longitudinal axis of the container 110. Thus the outward facing cylindrical surface 150 of lower wall section 146 may guide the plug seal device 140 into position and assist in preventing misalignment of the threads 114 and threads 116 as the sealing section 148 starts to engage with inner surface 121 of neck region 112 (as shown in FIG. 3), and as the closure 100 moves to a fully engaged position relative to container 110, as shown in FIG. 4.

Additionally, the presence of the lower wall section 146 extending longitudinally beneath sealing section 148 increases the stiffness of the sealing section 148 in response to radial compression forces exerted thereon. Thus, when sealing section 148 engages with inner surface 121 of the neck region 112 to provides a complete circumferential seal between plug seal device 140 and the inner surface 121 of neck region 112 of container 110, compression forces acting radially inwards are exerted by the inner surface 121 onto sealing section 148 which creates a radially inward deflection of the sealing section 148 and both the upper wall section 142 and the lower wall section 146. This radial inward deflection of sealing section 148 creates resisting hoop stresses (ie, circumferential stresses) in the upper wall section 142 and in lower wall section 146. The hoop stresses developed in the lower wall section 146 in particular, create radial outward reaction forces that enhance the sealing contact forces acting between the sealing section 148 and the inner surface 121 of neck region 112 of container 110.

An outer alignment circular/annular ring 152 may also be positioned radially outwardly from plug seal device 140 and inward from side wall 106, and may be integrally formed at and with a corner region that joins top wall 102 and side wall 106. Outer alignment ring 152 may operate in conjunction with the upper portion of upper section 142 of plug device 140 to assist with maintaining the generally parallel orientation of neck region 117 relative to plug seal device 140 and side wall 106 of closure 100 when closure 100 is fully engaged on neck region 112 of container 110.

A generally circular groove 154 may also be provided in the downward facing surface 104 of top panel 102. Groove 154 may be positioned adjacent the upper end of upper section 142 of plug seal device 140. Groove 154 may be configured to facilitate easier inward deflection of upper section 142 relative to top wall 102 of closure 100 when sealing section 148 engages with inner surface 121 of neck region 112 as described hereinafter. Additionally, groove 154 may facilitate easier outward deflection of the circumferential edge regions of top wall 102 relative to upper section 142 of plug seal device 140 if the internal pressure of a sealed container 110 is significantly increased, also as described further hereinafter. Groove 154 thus creates a hinge area of reduced stiffness to allow for easier relative angular displacement of top wall 102 and plug seal 142 relative to each other.

Figure 2:
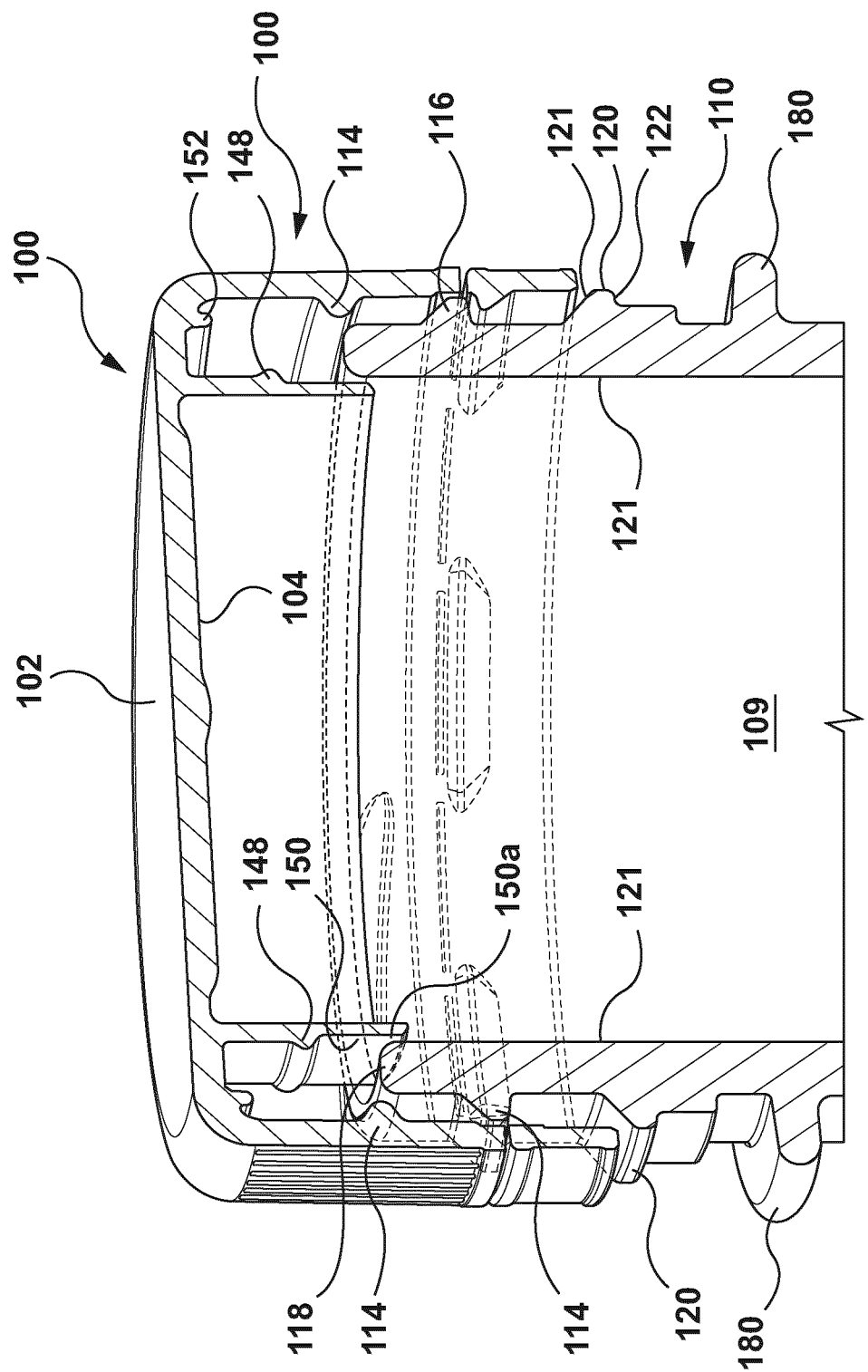
FIG. 2 is a broken away elevation section view of the closure and container of FIG. 1 with the closure and container at a commencement of pre-alignment position relative to each other.
Figure 5:
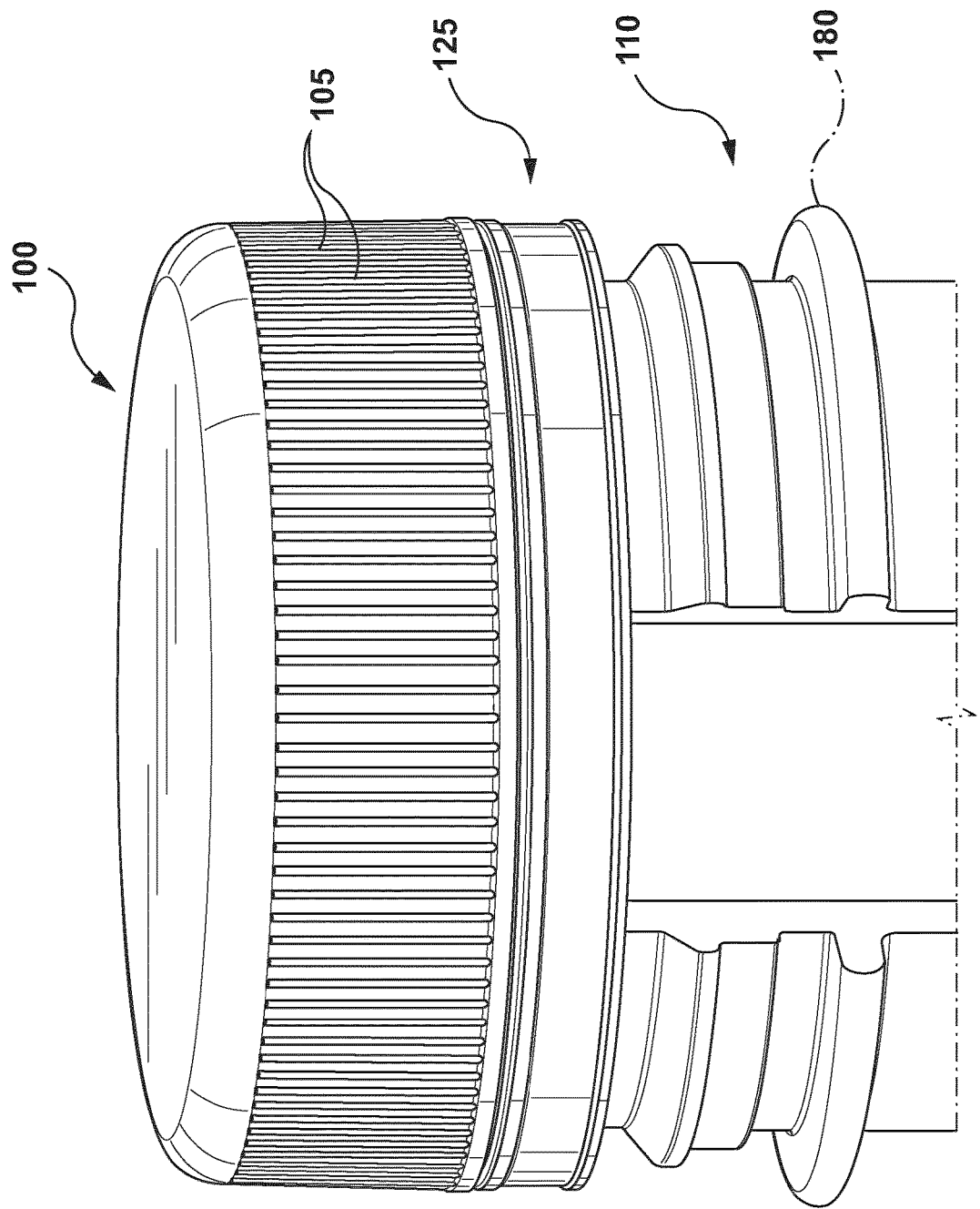
FIG. 5 is an upper perspective view with the container and closure of FIG. 1 in a disengaged position relative to each other, like in FIG. 1.
Figure 6:
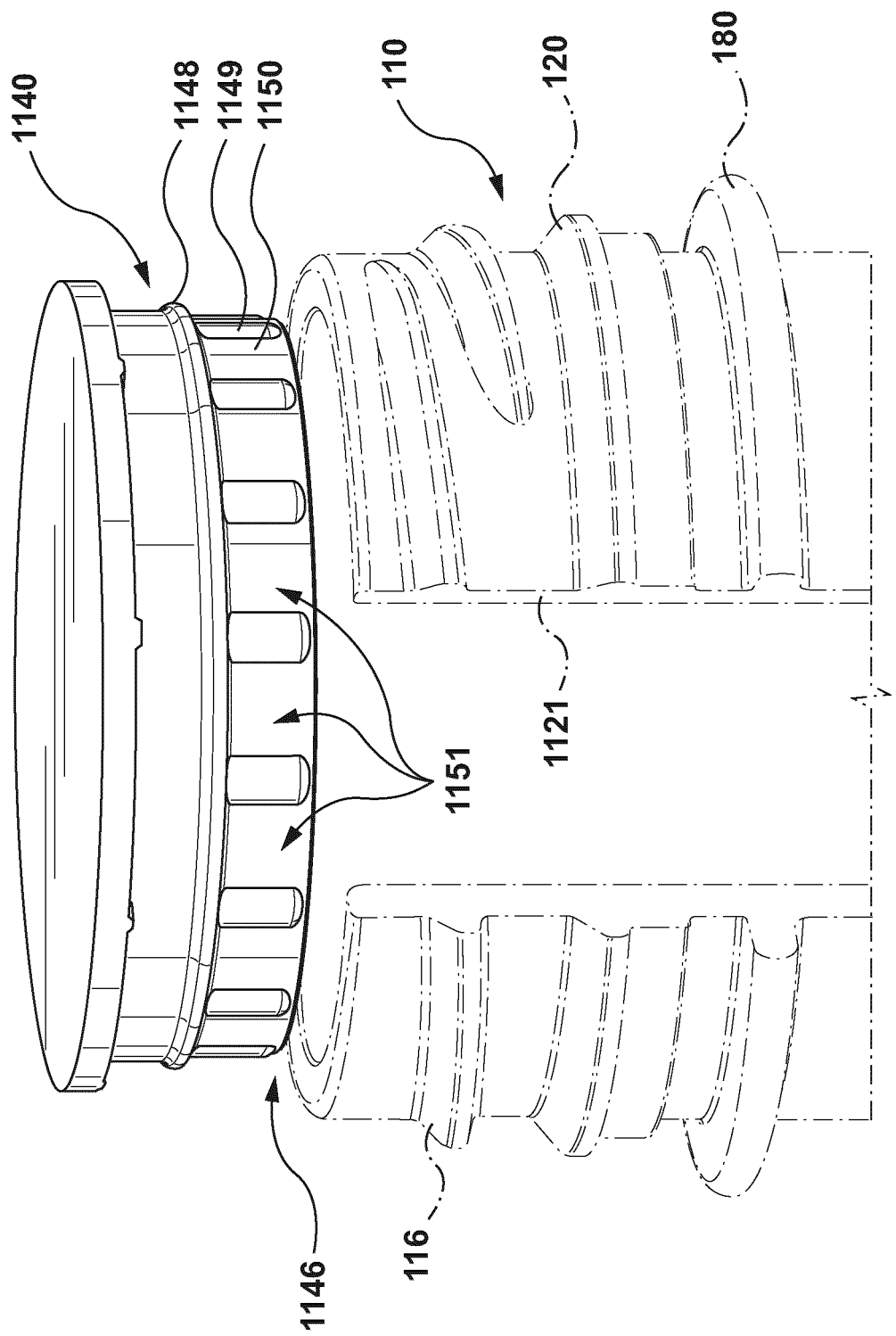
FIG. 6 is an upper perspective view of the container and plug seal device of a closure like that in FIGS. 1 to 5, in a disengaged position relative to each other, like in FIG. 1, but with only the plug seal device of the closure shown for ease of understanding.

With reference now to FIGS. 2, 3 and 4, it is illustrated how plug seal device 140 assists in moving closure 100 from the position shown in FIG. 14(*a*) to the correct thread start position shown in FIG. 14(*c*), through a correct thread rotation position such as shown in FIG. 14(*d*) to the full engagement position of the threads shown in FIG. 14(*e*). In FIG. 2 (and also depicted in FIG. 5), closure 100 is shown is an axial/vertical position and alignment relative to container 110 where a lower end portion 150*a* of outward surface 150 of lower wall section 146 may come into close proximity and may engage with the neck inner surface 121 proximate the upper portion or neck region 118. This positioning of lower wall section 146 of plug seal device 140 acts as a pre-alignment mechanism to help to ensure that plug seal 140 is properly axially longitudinally aligned within the inner cylindrical surface 121 of neck region 112. However, there will at this position be no interaction between seal section 148 and interior surface 121 of neck region 112 and typically there will not be significant elastic deformation, if any, of the lower wall section 146 and the rest of seal plug device 140 relative to top wall 102. Lower wall section 146 may provide some intermittent contact with inner surface 121 to ensure alignment about axis X-X of closure 100 relative to container 110.

With reference now to FIG. 3 it will be noted that: (a) seal section 148 has started to engage the interior surface of neck region 112 proximate upper portion 118; (b) thread (s) 114 are in angular rotational position relative to thread(s) 116 to commence for rotational threaded engagement of closure 100 relative to container 110. It is when the sealing section 148 of plug seal device 140 starts to engage with the inner surface 121 of the neck region 112 of container 110, that the radial compression forces acting on the plug seal device 140 may tend to cause the sealing section 148 and the entire plug sealing device 140 to rotate and/or deflect. However, the lower wall section 146 of plug sealing device 140 assists in keeping all the components of the closure 100 properly axially aligned. Horizontal/transverse rotation of the closure 110 is resisted by virtue of having upper wall section 142 above sealing section 148 and lower section 146 below sealing section 148 such that plug seal device 140 will tend to be forced to deform radially inward in the region of the contact of sealing section 148 with inner surface 121. This tends to facilitate proper engagement of threads 114 of closure 100 with threads 116 of container 110.

From the position shown in FIG. 3 to the position shown in FIG. 4, which is the final fully engaged position, seal section 148 is brought into full engagement with interior wall 121 of neck region 112. Due to the radial dimension of the outer surface of seal section 148, elastic radial inward deformation of plug seal device 142 will occur. As indicated above, when sealing section 148 engages with inner surface 121 of the neck region 112 to provide a complete circumferential seal between plug seal device 140 and the inner surface 121 of neck region 112 of container 110, compression forces acting radially inwards are exerted onto sealing section 148 which creates a radially inward deflection of the sealing section 148 and both the upper wall section 142 and the lower wall section 146. This radial inward deflection creates a resisting hoop stress in the upper wall section 142 and in lower wall section 146. The hoop stress developed in the lower wall section 146 in particular, creates radial outward reaction forces that enhance the sealing contact forces acting between the sealing section 148 and the inner surface 121 of neck region 112 of container 110.

Figure 7:
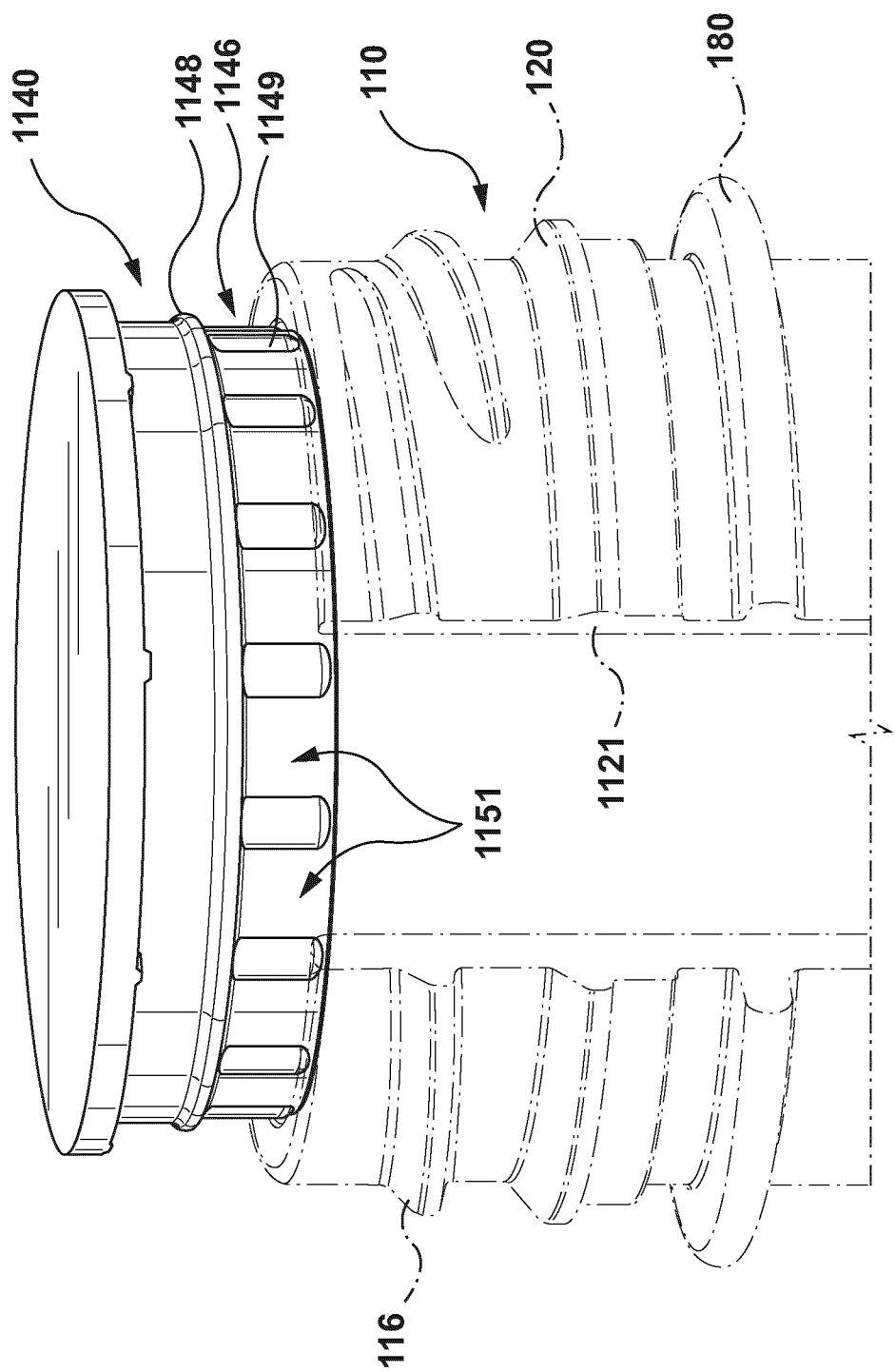
FIG. 7 is an upper perspective view of the plug device and container of FIG. 6 with the plug seal device and container at a commencement of pre-alignment position relative to each other.
Figure 8:
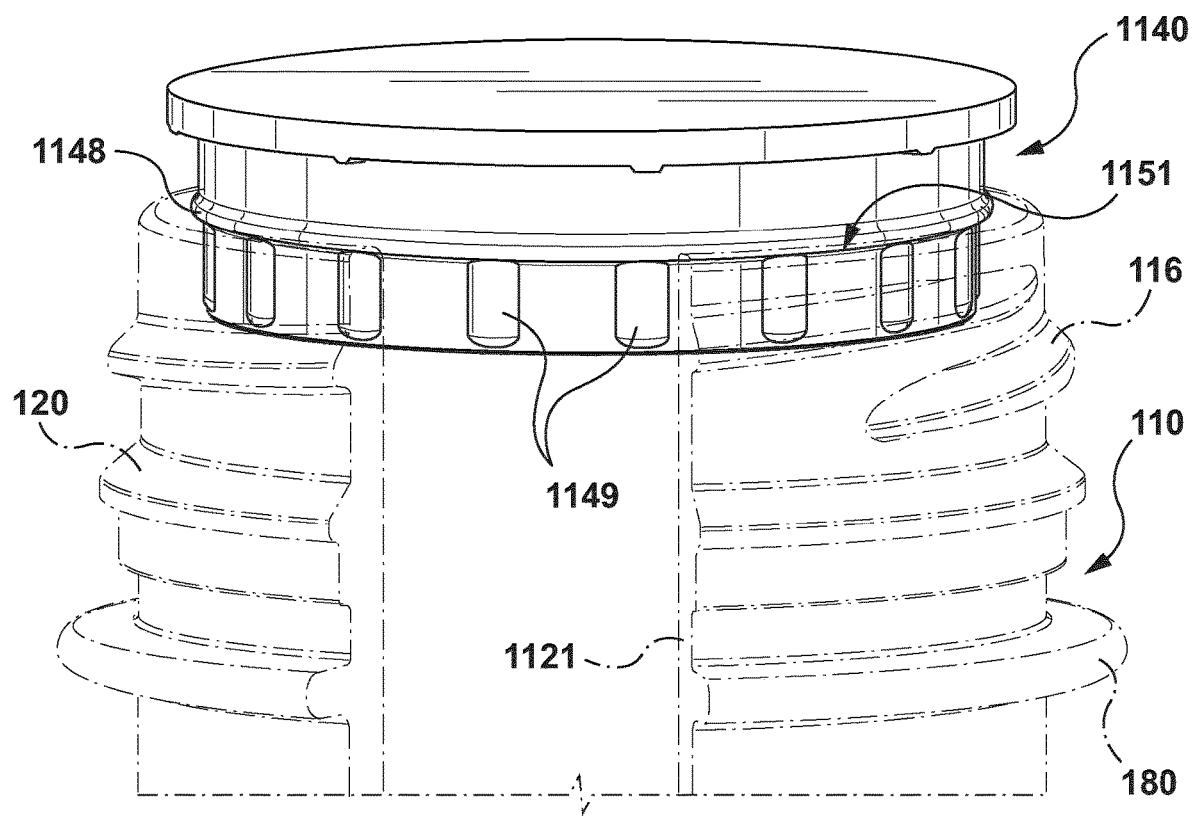
FIG. 8 is an upper perspective view of the plug seal and container of FIG. 6 with the closure and container in a commencement of seal engagement position relative to each other.
Figure 8A:
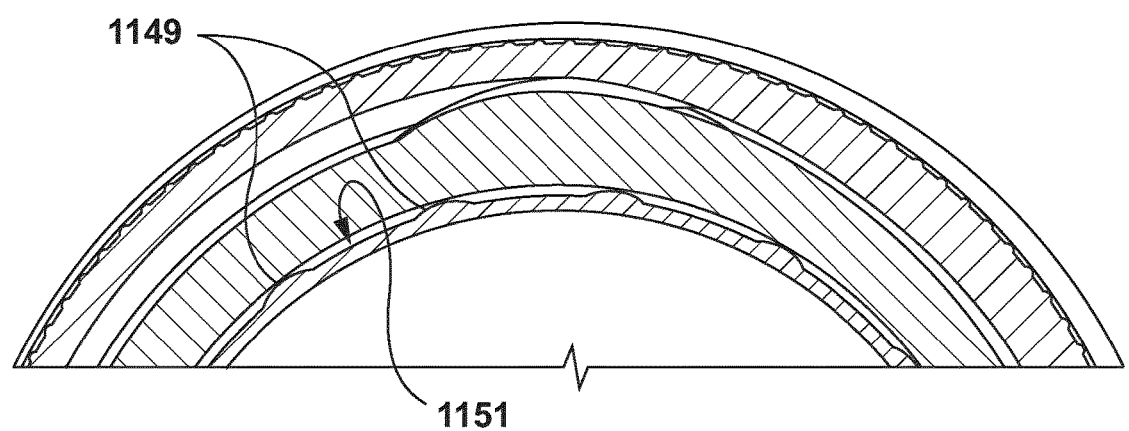
FIG. 8A is a horizontal cross section view at 8A-8A in FIG. 8.

With reference now to FIGS. 6 to 9, an example alternate embodiment for a plug seal device 1140 that may be incorporated as part of closure 100 instead of plug seal device 140. Plug seal device 1140 may be constructed substantially the same as plug seal device 140 except in its lower wall section designated 1146. Lower wall section 1146 has an outward facing surface 1150. Projecting radially outward from outward facing surface 1150 may be integrally formed vertically extending rib members 1149 that have a surface with an outward radial distance that is greater than the outward radial distance of outward facing surface 1150, but which is less than the outward radial distance of sealing section 1148 (which may be configured like seal section 148). Thus slots/channels 1151 may be provided between the rib members 1149 to allow for venting of gas/fluid that is contained within container 110 when a closure 100 incorporating a plug seal device 1140 is being disengaged from the neck region 112 of a container 110. During the removal of the closure 100 from the neck region 112 there will there will be a relative angular orientation there between when the threads 114 of closure are still engaged to threads 116 of container 110 and where the sealing section 1148 of the plug seal device 1140 is no longer in sealing contact with inner surface 121 of container 1110 whereby a passageway is defined through channels 1151 between plug device 1140 and inner surface 121 of neck region 112 that allows escape of fluid/gas past the spiral threads 114, 116 to the external environment (such as shown in FIGS. 7 and 8).

In addition to having this venting capability, lower wall section 1146 may still fulfil the same alignment function as lower wall section 146 of plug seal device 140 as described herein. Thus the outward surface area of ribs 1149 may guide the plug seal device 1140 into position and assist in preventing misalignment of the threads 114 and threads 116 as the sealing section 1148 starts to engage with inner surface 121 of neck region 112 (similar to as shown in FIG. 3 from plug seal device 140), and as the closure 1100 moves to a fully engaged position relative to container 110, as shown in FIG. 9.

Figure 10C:
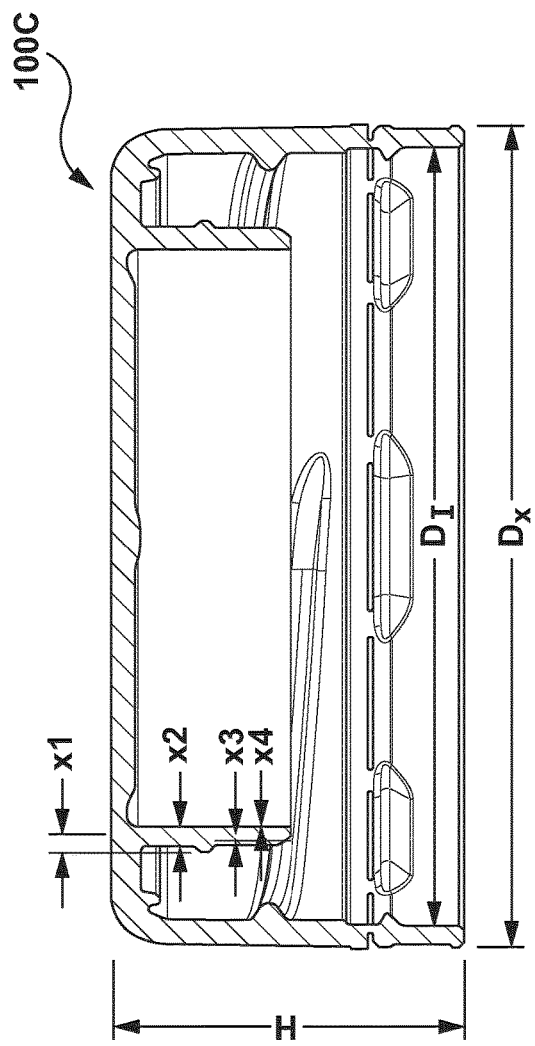
Figure 10D:
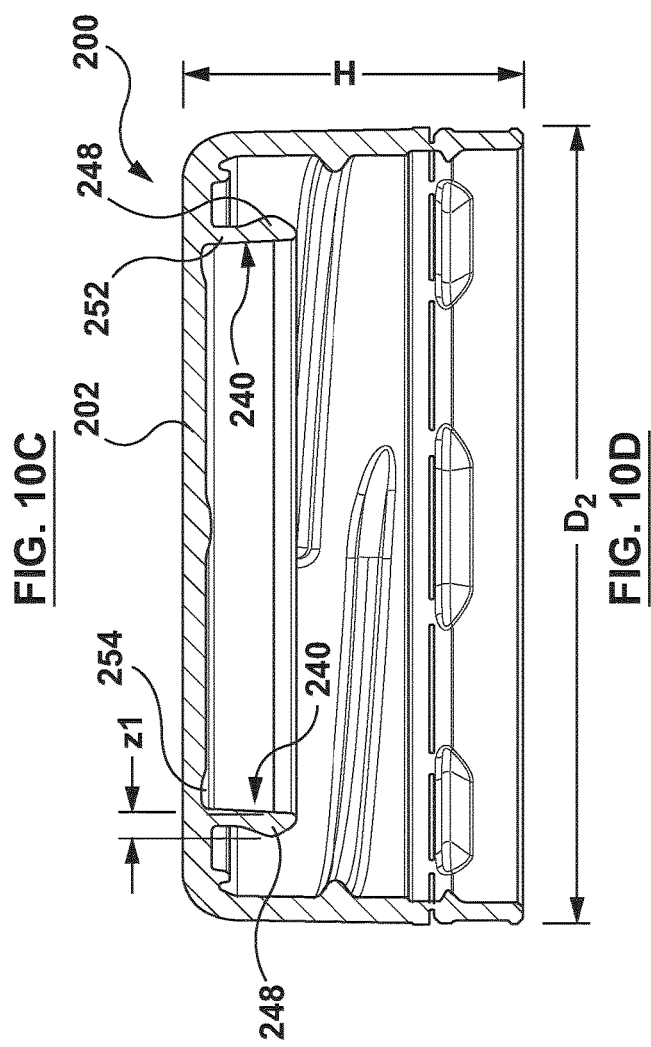
FIG. 10D is a vertical elevation medial cross section view through a known closure.

With reference now to FIGS. 10A to 10D, in FIGS. 10A to 10C are shown nominal desired construction dimensions for example closures 100A, 100B and 100C generally formed like closure 100 described herein with a plug seal device 1140. Also, in FIG. 10D is shown a comparative closure 200 that does not include a lower section below a sealing section 248 on its plug seal device 240.

It will be noted that for each of closures 100A, 100B, 100C:
the overall wall thickness width X1 of the sealing section (0.875 mm) is greater than the width of the upper sections X2 and the widths X3/X4 of the lower sections;
the wall thickness width of the upper sections X2 is greater than the widths of the lower section X3/X4;
with reference to closure 100A, weighing a nominal 3.7 gram, dimension X1 would be approximately 0.875 mm;
with reference to closure 100B, weighing a nominal 3.85 gram, dimension X1 would be approximately 1.125 mm;
with reference to closure 100C, weighing a nominal 4.0 gram, dimension X1 would be approximately 1.375 mm.

Additionally it will be noted that for each of closures 100A, 100B and 100C:
the outside diameter C of the sealing section is greater than the inside diameter of the container (Dci);
the outside diameter B of the lower wall section is less than or equal to the inside diameter of the container (Dci); and
the outside diameter A of the lower wall section is less than the inside diameter of the container (Dci).

Also, it will be noted that X3 is the thickness of the wall in lower wall section 1146 where there is a rib 1149, whereas X4 is the thickness of the wall in lower section where there is channel/vent 1150.

It will also be noted that comparing closures 100A and 200, made of the same material and being the same weight (and thus using same total amount of material is their formation) and with the same outer diameters Dx/Dz and heights H, the width/thickness of the sealing section Z1 in closure 200 is significantly greater than the width of the sealing section X1 of closure 100A. Thus, using the same overall amount of plastic/polymer material, the plug seal device 1140 of closure 100A can effectively be thinner and longer than the plug seal device 240 of closure 200. By thinning the wall thickness, but extending the length of the plug seal device 140/1140, the lower section 146/1146 can be provided to function as a pre-aligner of closure 100 relative to container 110.

In general, the depth of the groove 154 may be in the range of about 5% to 50% of the depth of the top wall 1502; and the width of the groove 154 may be in the range of about 50% to 250% of the thickness to the top wall.

By contrast closure 200 having a weight of 3.7 gram of the same material as closures 100A-C, has a wall thickness dimension Z1 of 1.21 mm for the sealing section 248.

Figure 11B:
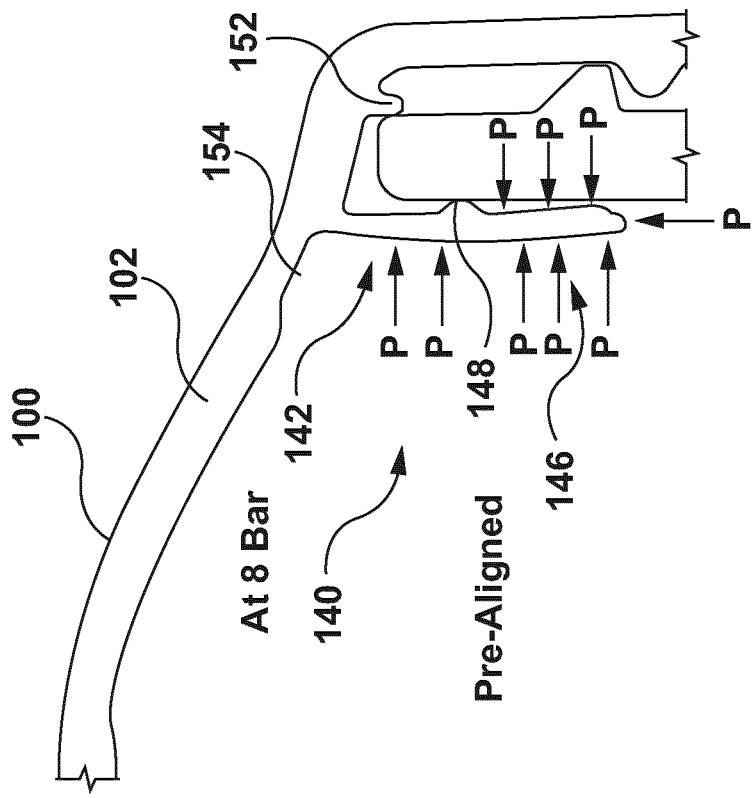
FIG. 11B is a partial vertical elevation medial cross sectional view through the example closure and container of FIG. 11A, with the closure and container in the final engagement position after completion of the engagement process, but with the closure and container being subjected to increased internal pressure within the inner cavity of the container.
Figure 11A:
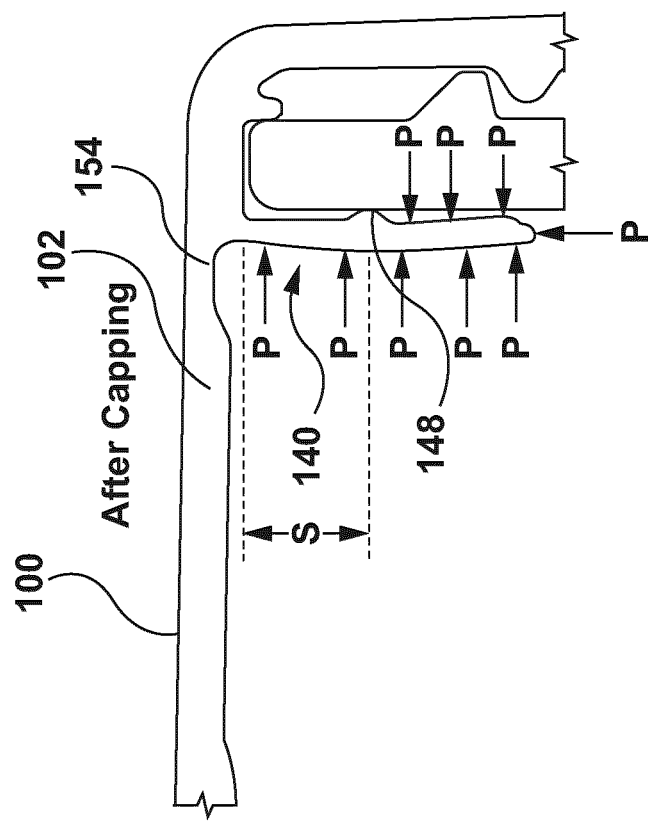
FIG. 11A is a partial vertical elevation medial cross sectional view through an example closure and container with the closure and container in a final engagement position after completion of the engagement process.
Figure 11D:
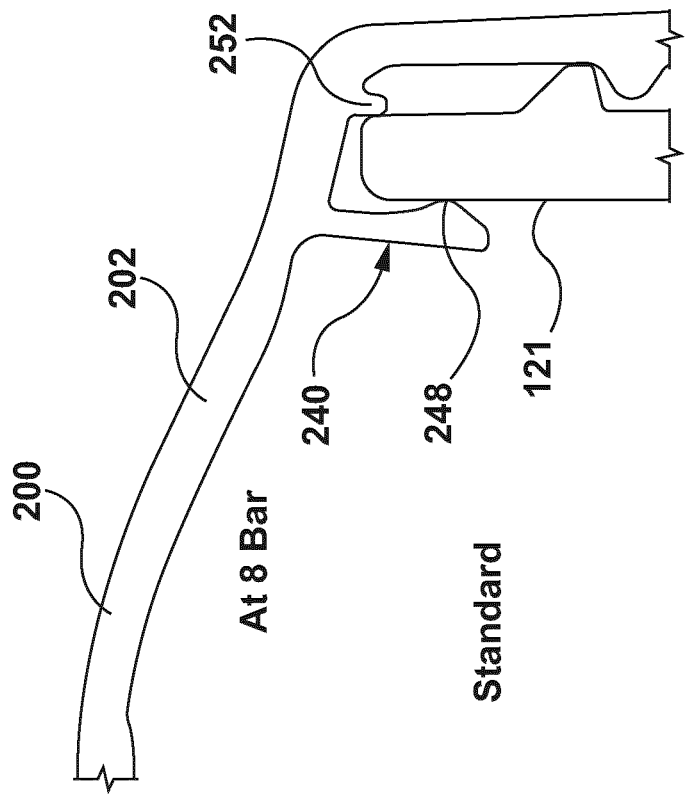
FIG. 11D is a partial vertical elevation medial cross sectional view through the example closure and container of FIG. 11C, with the closure and container in the final engagement position after completion of the engagement process, but with the closure and container being subjected to increased internal pressure within the inner cavity of the container.
Figure 11C:
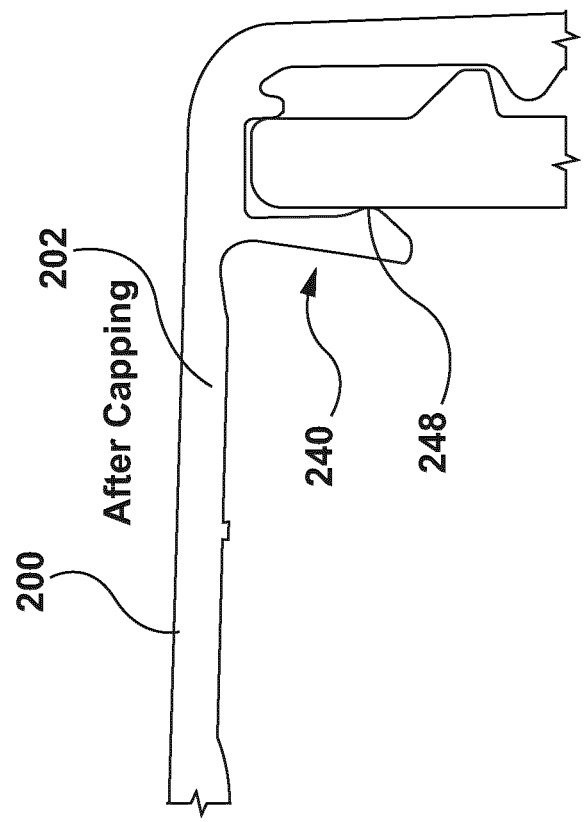
FIG. 11C is a partial vertical elevation medial cross sectional view through a known closure and container with the closure and container in a final engagement position after completion of the engagement process.
Figure 14A:
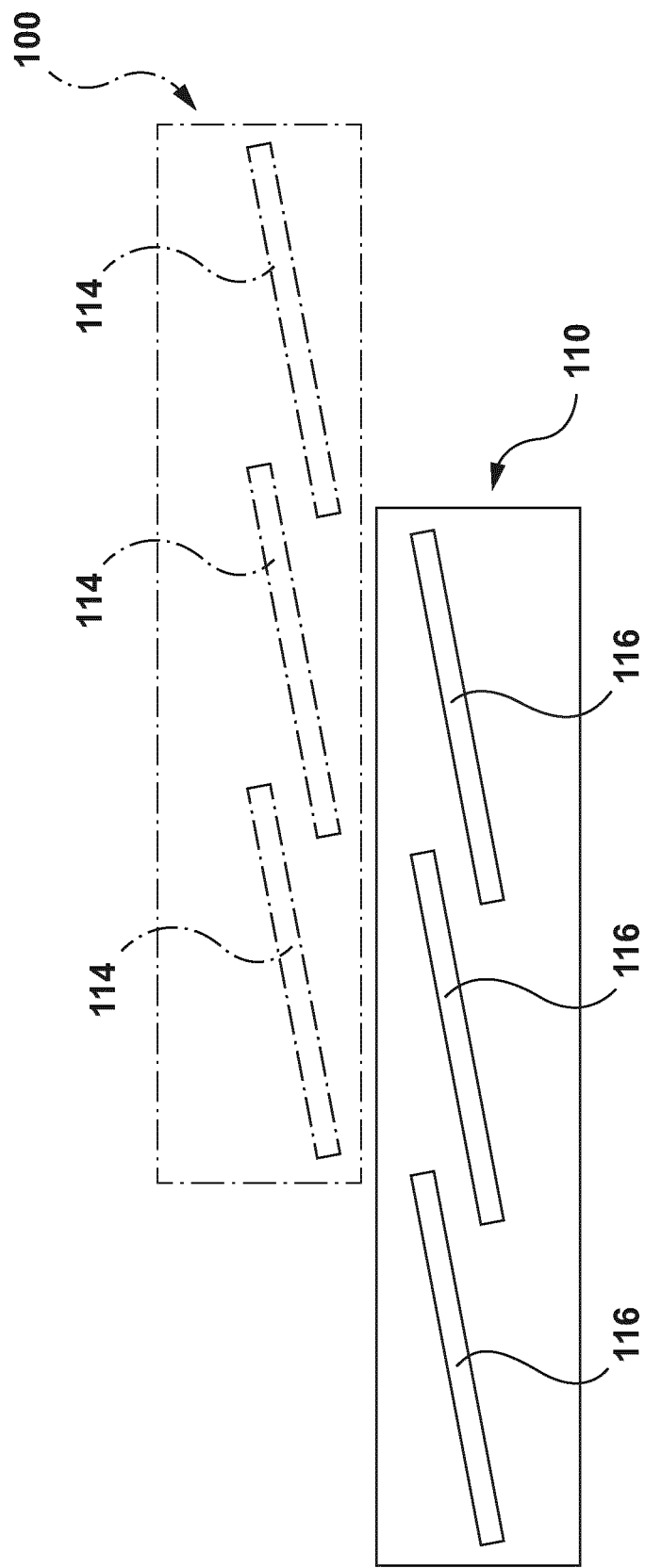
FIGS. 14A to 14F are schematic views of a closure and container showing the sequential engagement of threads from a disengaged position to a properly fully engaged position.
Figure 14B:
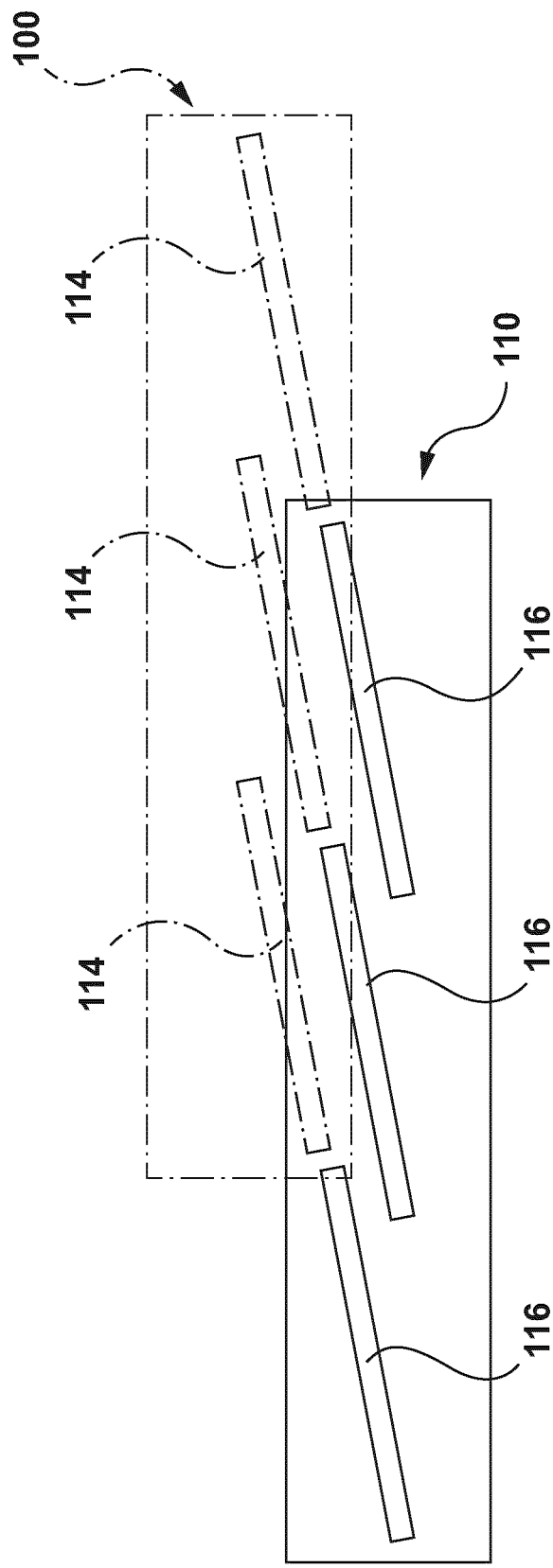
Figure 14C:
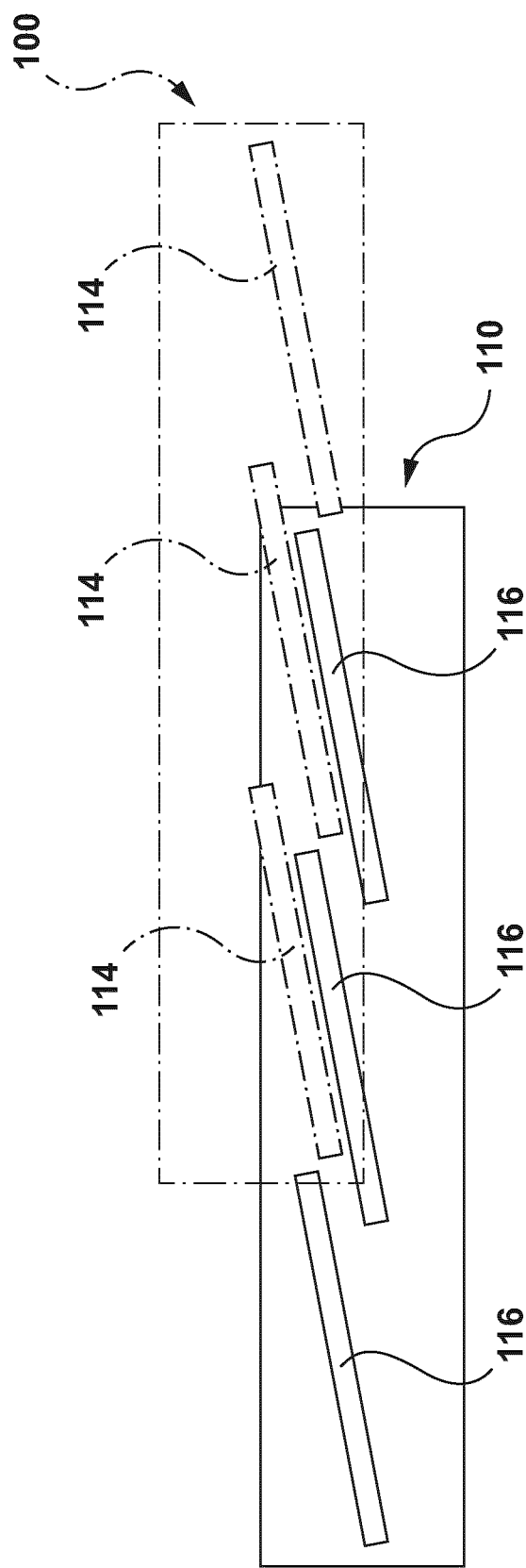
Figure 14D:
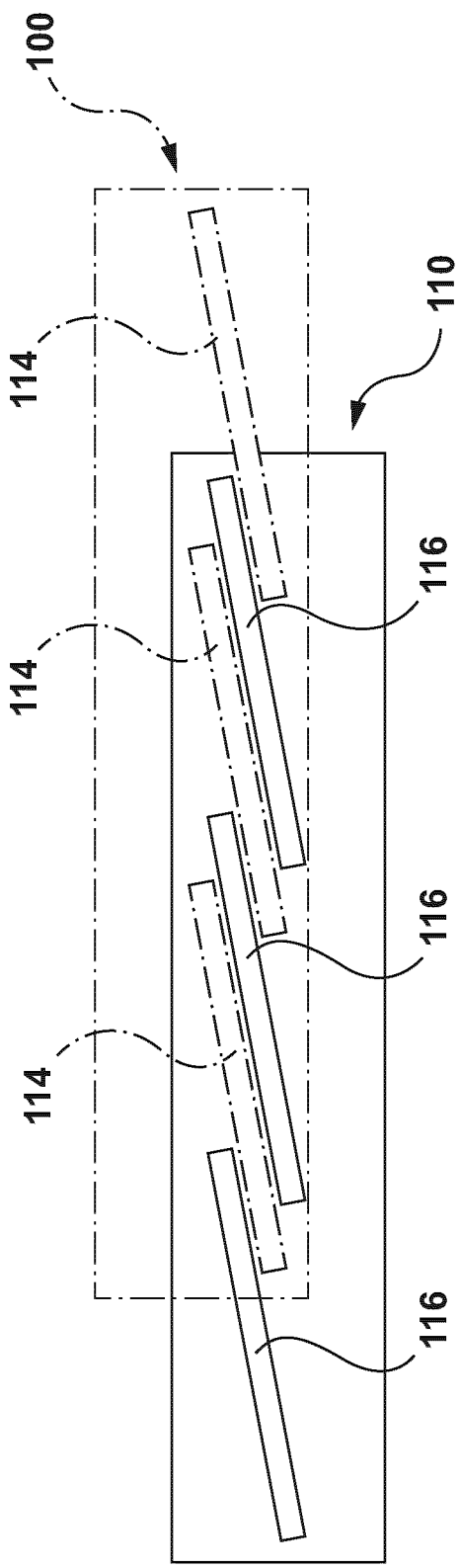
Figure 14E:
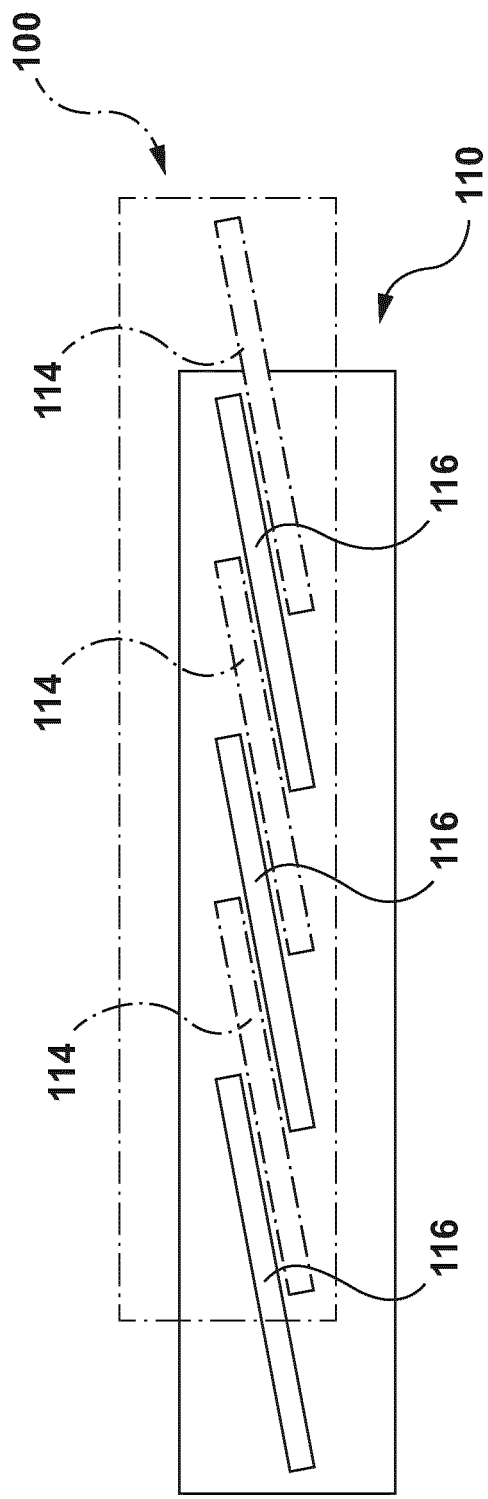
Figure 14F:
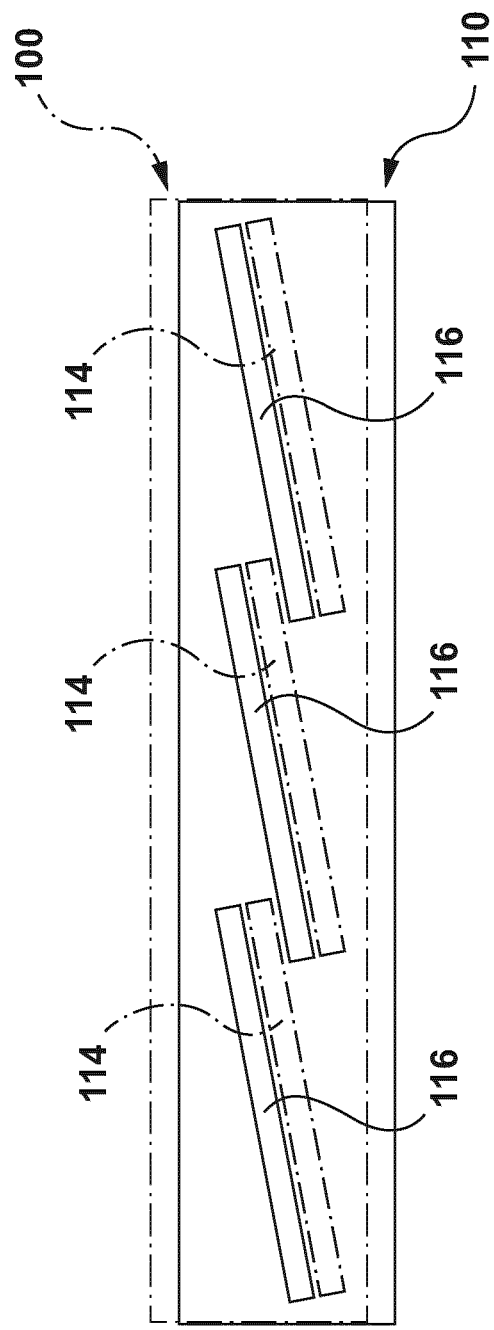

With reference now to FIGS. 11(a) to (d) an advantage of the plug seal device 140 in closure 100 (and which is also an advantage of plug seal device 1140) may be observed in FIGS. 11(a) and (b) compared to closure 200 in FIGS. 11(c) and (d). In FIG. 11(c) closure 200, does not have a lower section formed in its plug seal 240 and it is relatively wide in both is dimensions Z1 and Z2 [FIG. 10(d)] compared to dimensions X1 and X2 in particular of plug seal 140. Therefore, when the interior pressure within the container is increased (as it may be for example once contents are loaded into the inner cavity of the container) such as to create a pressure of 8 Bar as shown in FIG. 11(d), there is significant distortion/deflection of the top panel 202. Since the interconnection between top panel 202 and plug device 240 is relatively stiff, there is will tend to me also deflection of plug device 240 to a small degree with panel 202, and also a upward movement of alignment ring 252. This will tend to have a significant detrimental effect on the contact pressure between the seal section 248 and the neck wall surface 121. This is demonstrated in chart of FIGS. 12(a) and (b) which illustrates the reduction in plug seal contact pressure for a closure 100 engaged with a container made from PET with both closures 100 and container made from "nominal" dimensions for a 3.7 gram closure as illustrated in FIG. 10A. It will be noted there is a significant drop in the seal force from 78.059 MPa to 68.64 MPa. (which is still a suitable contact force/pressure for most applications).

By contrast, in FIG. 11(a), closure 100, has a relatively thin lower section 146, sealing section 148 and upper section 142 formed as part of its plug seal device 140. Additionally, groove 154 acts to provide a relatively weak area in terms of stiffness in the vicinity of where the upper section 142 of plug seal device 142 joins with top wall 102. The result is that this area tends to act like a hinge when the interior pressure within container 110 is increased to 8 Bar as shown in FIG. 11(b), and so top wall 102 can angularly deflect relative to upper section 142 and the rest of plug seal device 140. Also, as indicated above, when sealing section 148 engages with inner surface 121 of the neck region 112 to provide a complete circumferential seal between plug seal device 140 and the inner surface 121 of neck region 112 of container 110, compression forces acting radially inwards are exerted onto sealing section 148 which creates a radially inward deflection of the sealing section 148 and both the upper wall section 142 and the lower wall section 146. This radial inward deflection creates a resisting hoop stress in the upper wall section 142 and in lower wall section 146. The hoop stress developed in the lower wall section 146 in particular, creates radial outward reaction forces that enhance the sealing contact forces acting between the sealing section 148 and the inner surface 121 of neck region 112 of container 110. The result is a substantially reduced detrimental effect on the contact pressure between the seal section 148 and the inner surface 121 of the neck region neck wall. This is demonstrated in chart of FIGS. 12(c) and (d) which illustrates substantially the same plug seal contact pressure for a closure 100 engaged with the same container made from PET with both closures 100 and container made from "nominal" dimensions for a 3.7 gram closure as illustrated in FIG. 10A. It will be noted there is actually a slight increase in seal force from 67.574 MPa to 68.015 MPa (which is a suitable contact force/pressure for most applications).

A similar effect is observed in the chart of FIGS. 13(a)-(d) which is directed to closures and container similar to the closure and container tested in FIGS. 12(a)-(d) but which directed to "LMC" of both container and closure ["LMC" means Least Material Condition, which is a standard term used in Geometric Dimensioning and Tolerancing (GD & T) to mean a condition where adjacent members are at their opposite dimensional limits (i.e. maximum separation)]. In FIGS. 13(a) and (b) reduction in plug seal contact pressure for a closure 100 engaged with a container has a drop in the contact seal force from 65.225 MPa to 61.001 MPa (which is still a suitable contact force/pressure for most applications).

Again, by contrast as shown in the chart of FIGS. 12(c) and (d) is will be noted there is actually only a very, almost negligible decrease in contact seal force from 57.721 MPa to 57.638 MPa (which also are suitable contact force/pressures for most applications).

The difference in contact pressure shown in FIGS. 12 and 13 is a result of the size variation of the container-neck diameter which is at nominal dimension in FIG. 12 and at least material condition (LMC) in FIG. 13.

The result of the foregoing construction of a closure 100 with plug seal device 140 or 1140, is that for a closure 100 made of 3.7 gram of high density polyethylene(HDPE) material, the plug device 140/1140 can have a relatively thin wall thickness along an extended length and yet be able to (a) provide for a lower section with a pre-alignment features and (b) maintain an acceptable seal contact pressure/force in situations where the internal pressure in the cavity of the container increases a significant degree causing deflection of the top wall 102.

Figure 10E:
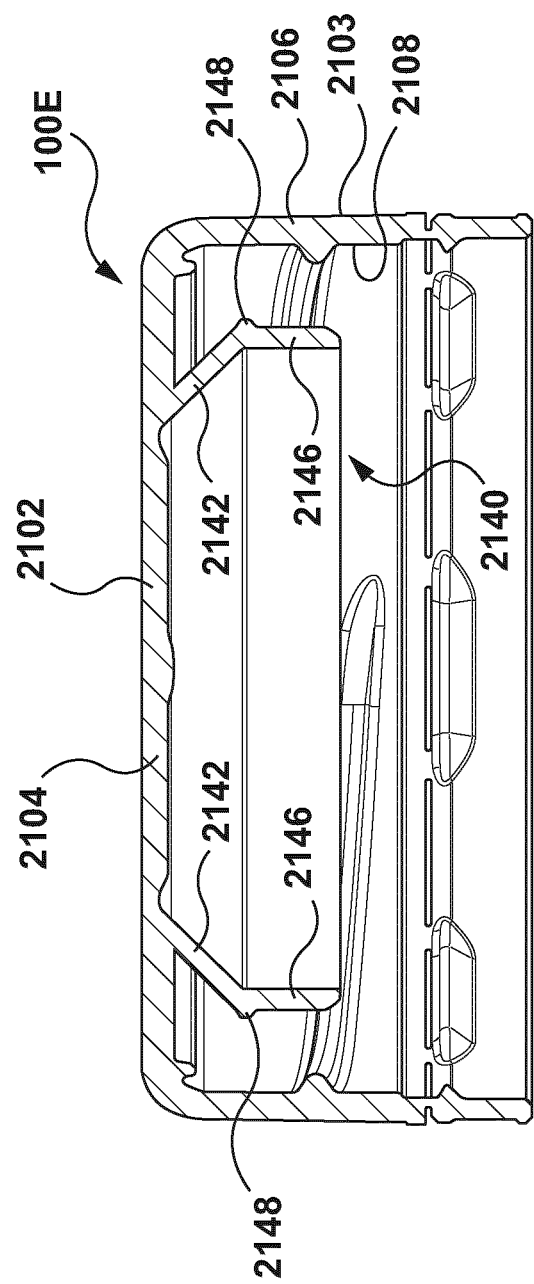
FIG. 10E is a vertical elevation medial cross section view through an alternate embodiment.

By way of only one example variation, with reference to FIG. 10E, a closure 100E, may be structurally the same as closure 100 and 100A-C as described above, except as follows. Closure 100E may be configured in a generally right circular cylindrical tube shaped shell that is closed at a top end with a circular disc shaped top wall 2102 with a downward facing, generally flat, surface 2104. The shell also has a generally right circular cylindrical tubular shaped side wall 2106 having an outward facing generally right circular cylindrical surface 2103 and inwardly facing, generally right circular cylindrical surface 2108. Plug seal device 2140 may have a generally frusto-conical shaped tubular upper wall section 2142 and a generally right circular cylindrical tubular lower wall section 2146. Upper wall section 2142 and lower wall section 2146 may be interconnected and divided vertically/axially from each other by a sealing section 2148 located at the boundary of the upper and lower wall sections. Sealing section 2148 may be integrally formed as part of plug seal device 2140 and may be formed in a generally semi-circular toroidal shape, lobe shape, annular ring shape or any other suitable shape that protrudes radially outward beyond both the radially outward facing edge of frusto-conical surface of upper wall section 2142 and radially outward beyond the radially outward facing cylindrical surface 2150 of lower wall section 2146. Sealing section 2148 is configured such that when it engages with inner surface of the neck region of a container it provides a complete circumferential seal between plug seal device 2140 and the inner surface of neck region of container, when the sealing section 2148 is received through opening of the neck region and the sealing section is engaged with the inner surface of the container. Lower wall section 2146 provides an alignment function to properly radially align plug seal device 2140 and thus closure 100E relative to container, as plug seal device 2140 is inserted into the opening of the neck region. Thus the outward facing cylindrical surface of lower wall section 2146 may guide the plug seal device 140 into position and assist in preventing misalignment of the threads as the sealing section 2148 starts to engage with inner surface of neck region and as the closure 100E moves to a fully engaged position relative to container.

Lower wall section 2146 may also increase the stiffness of the sealing section 2148 in response to radial compression forces exerted thereon. Thus, when sealing section 2148 engages with inner surface of the neck region of a container 110 to provide a complete circumferential seal between plug seal device 2140 and the inner surface of the container, compression forces acting radially inwards are exerted by the inner surface onto sealing section 2148 which creates a radially inward deflection of the sealing section 2148 and both the upper wall section 2142 and the lower wall section 2146. This radial inward deflection of sealing section 2148 creates resisting hoop stresses (ie, circumferential stresses) in the upper wall section 2142 and in lower wall section 2146. The hoop stresses developed in the lower wall section 2146 in particular, create radial outward reaction forces that enhance the sealing contact forces acting between the sealing section 2148 and the inner surface of the container 110.

Other variations are possible.

With reference to FIG. 15, an example injection molding system 3100 is illustrated schematically that may be employed to form any of the closures depicted in FIGS. 1 to 8A, and FIGS. 10A-C and 10E. System 3100 may in general be conventionally configured and may comprise an injection mold 3116 having a cavity mold half 3102 and an opposite core mold half 3114. System 3100 may also include an injection unit 3104 and a clamping unit 3106. The operation of system 3100 and its components may be controlled by a controller, such as a programmable logic controller (PLC) or industrial computer. Communication links between various components of system 3100 and controller may be provided and such links may be wired and/or wireless. Cavity mold have 3102 may contain a plurality of mold cavities 3103 and cavity mold half 3102 may be attached to a stationary platen 3110. Core mold half 3114 may have a corresponding plurality of mold cores 3127 and the core mold half 3114 may be attached to a moving platen 3115. Thus the core mold half 3114 may be capable of reciprocating movement in the X direction relative to the cavity mold half 3102 between a mold open and a mold closed position. The stationary platen 3110 and the clamping unit 3106 may be linked by tie bars.

In general operation, when cavity mold half 3102 and core mold half 3114 are in a closed configuration, the mold is clamped shut by the clamping unit and injected material is supplied to the mold cavities 3103 to form the closures such as closures 100, 100A-C and 100D, as described above. At a suitable time, mold 3116 can be opened separating the core mold half 3114 from the cavity mold half 3102 in the X direction.

Of course, the above described embodiments are intended to be illustrative only and in no way limiting. The described embodiments of carrying out the invention are susceptible to many modifications of form, arrangement of parts, details and order of operation.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

What is claimed is:

1. A closure comprising:
   (a) a top wall and a side wall depending from said top wall;
   (b) a plug seal device depending from said top wall within said side wall;
   said plug seal device having an upper section comprising a substantially right circular cylindrical tube depending from said top wall, a lower section comprising a substantially right circular cylindrical tube, and a sealing section defining a boundary between said upper section and said lower section;
   said upper section having an overall wall thickness width and an outer diameter less than an overall wall thickness width and an outer diameter of the sealing section;
   said sealing section operable such that when said plug seal device is inserted in an opening to an inner cavity in a container, said sealing section engages with an inner container surface, to provide sealing contact between said sealing section and said inner container surface; and
   wherein an outward facing surface of said lower section comprises a plurality of vertically extending rib members extending below said sealing section, said plurality of rib members configured to define at least one channel there between, operable to vent fluid and/or gas when said sealing section is not in sealing engagement with said container surface.

2. The closure as claimed in claim 1 wherein when in operation, said plug seal device is inserted into said opening to said inner cavity of said container, said sealing section creates an initial seal between said inner cavity of said container and said external environment.

3. The closure as claimed in claim 1 wherein said sealing section is formed as an annular protrusion extending radially beyond an outward surface of each of said upper and lower sections of said plug seal device.

4. The closure as claimed in claim 1 wherein said sealing section comprises a ring shaped member having an arcuate outer sealing surface.

5. The closure as claimed in claim 1 wherein said lower section has a generally cylindrical outer surface.

6. The closure as claimed in claim 1 wherein said upper section has a generally cylindrical outer surface.

7. The closure as claimed in claim 6 wherein said outer diameter of said upper section is greater than the outer diameter of said lower section.

8. The closure as claimed in claim 1 wherein said upper section has a wall thickness that is greater than the wall thickness of the lower section.

9. The closure as claimed in claim 8 wherein said top wall has a wall thickness greater than said upper section of said plug seal device.

10. The closure as claimed in claim 1 wherein said seal is an only seal between said closure and said container surface of said container.

11. The closure as claimed in claim 1 wherein said inner container surface of said container is an inner wall surface of said container.

12. The closure as claimed in claim 1 wherein said lower section is configured and operable to assist in maintaining substantial axial alignment of said closure and said container while said sealing section is being moved into engagement with said inner container surface of said container.

13. The closure as claimed in claim 1 wherein said closure has at least one thread on an interior surface of said side wall, said at least one thread of said interior surface of said side wall being configured and operable to releasably engage with a complementary thread on an outward facing surface of said container.

14. The closure as claimed in claim 1 wherein said closure has at least one thread on an interior surface of said side wall, said at least one thread of said interior surface of said side wall operable to releasably engage with a complementary thread on an outward facing surface of said container, and wherein said closure is operable such that said plurality of rib members defines said at least one channel to vent said fluid and/or gas when said sealing section is no longer is in sealing contact with the said inner container surface whereby a passageway is defined through said at least one channel between the plug seal device and said container inner surface to allow the escape of said fluid and/or gas past said complimentary threads to the external environment.

15. The closure as claimed in claim 1 wherein said top wall is a generally circular disc shape and said side wall is generally cylindrically shaped, with a generally cylindrical shaped inner surface.

16. The closure as claimed in claim 1 wherein said top wall comprises an annular groove in an inner surface of said top wall.

17. The closure as claimed in claim 16 wherein said annular groove is located proximate and inward to the location where said upper section of said plug seal device is joined to said to top wall, said annular groove operable to provide reduced stiffness to bending of said plug seal device relative to said top wall, when said top wall is subjected to forces resulting from increased pressure within said container when said closure is sealing said container.

18. The closure as claimed in claim 1 wherein said closure further comprises a generally cylindrically shaped tamper evident band located beneath said lower section of said plug seal device, said tamper evident band having frangible connectors connecting said tamper evident band to a bottom of said side wall.

19. The closure as claimed in claim 1 such that during operation, when said plug seal device is inserted in said opening to said inner cavity in said container and engages with said inner container surface to provide a seal between an inner cavity of said container and the external environment, said plug device is deflected inwards.

20. The closure as claimed in claim 1 wherein:
   the sealing section has outside diameter that is greater than an inside diameter of the container;
   the lower wall section has an outside diameter that is less than the inside diameter of the container.

21. A combination of a closure and a container:
   (i) said closure comprising a closure as claimed in claim 1; and
   (ii) a container comprising:
   (a) a container wall enclosing an inner cavity, said container wall having an opening into said inner cavity, said container wall having an inner container surface proximate said opening;
   said sealing section of said plug seal device being configured and operable when said plug seal device is inserted in said opening, to engage with said container surface to provide an initial seal between said inner cavity of said container and the external environment.

22. A system for making a closure as claimed in claim 1, said system comprising a first mold half and a second mold half, said first and second mold halves being configured and operable to be movable relative to each other between (i) a first position which creates a mold cavity when said first and second mold halves are in a closed relationship to each other wherein a molded closures may be formed in the mold cavity and (ii) a second position where said first and second mold halves are in a separated relationship wherein a molded closure molded in said mold cavity can be removed from said mold cavity.

23. The system as claimed in claim 22 further comprising an injection unit operable to inject an injection material for forming said closure into said mold cavity when said first and second mold halves are in said closed relationship to each other.

24. The system as claimed in claim 23 further comprising a clamping unit operable to clamp said first and second mold halves in said closed relationship to each other when said injection unit is injecting said injection material into said mold cavity.

25. The closure as claimed in claim 1 wherein said lower section is configured and operable when being inserted into said opening to provide axial alignment of said closure with said container prior to engagement by said sealing section with said inner container surface.

26. The closure as claimed in claim 1 wherein said sealing contact between said sealing section and said inner container surface further creates resisting hoop stresses in at least the lower section, thereby enhancing said sealing contact between said sealing section and said inner container surface.

27. A closure comprising:
   (a) a top wall and a tubular side wall extending from said top wall;
   (b) a tubular plug seal device extending from said top wall within and spaced from said side wall;
   said plug seal device having a sealing section, an upper section extending from said sealing section upwards to said top wall, and a lower section comprising a substantially right circular cylindrical tube extending downwards from said sealing section;
   said upper section comprising a substantially right circular cylindrical tube having an overall wall thickness width and an outer diameter less than an overall wall thickness width and an outer diameter of the sealing section;
   said sealing section operable such that when said plug seal device is inserted in an opening to an inner cavity in a container, said sealing section engages with an inner container surface to provide a seal between an inner cavity of said container and an external environment; and
   wherein an outward facing surface of said lower section comprises a plurality of vertically extending rib members extending below said sealing section, said plurality of rib members configured to define at least one channel there between, operable to vent fluid and/or gas when said sealing section is not in sealing engagement with said container surface.

28. The closure as claimed in claim 27, wherein said lower section is configured and operable when being inserted into said opening, to provide axial alignment of said closure with said container prior to engagement by sealing section with said inner container surface.

29. The closure as claimed in claim 27 wherein said lower section is configured and operable to assist in maintaining substantial axial alignment of said closure and said container while said sealing section is being moved into engagement with said inner container surface of said container.

30. The closure as claimed in claim 27 wherein in operation, when said sealing section engages with said inner surface of the container, compression forces acting radially inwards are exerted onto said sealing section which creates a radially inward deflection of the sealing section and both the upper section and the lower section, creating a resisting hoop stress in the lower section.

31. The closure as claimed in claim 27 wherein when said sealing section engages with the inner container surface to provide a seal between the inner cavity of said container and the external environment, resisting hoop stresses are created in at least the lower section, thereby enhancing said seal between the inner cavity of said container and the external environment.

* * * * *